US010534968B1

(12) United States Patent
Clauss et al.

(10) Patent No.: US 10,534,968 B1
(45) Date of Patent: Jan. 14, 2020

(54) VERIFYING ODOMETER MILEAGE USING CAPTURED IMAGES AND OPTICAL CHARACTER RECOGNITION (OCR)

(71) Applicant: STATE FARM MUTUAL AUTOMOBILE INSURANCE COMPANY, Bloomington, IL (US)

(72) Inventors: Mark E. Clauss, Bloomington, IL (US); David W. Thurber, Sherman, IL (US); Matthew Eric Riley, Sr., Heyworth, IL (US); Richard J. Lovings, Bloomington, IL (US); Steven J. Balbach, Bloomington, IL (US); Nicholas R. Baker, Normal, IL (US); J. Lynn Wilson, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 906 days.

(21) Appl. No.: 15/097,892

(22) Filed: Apr. 13, 2016

Related U.S. Application Data

(60) Provisional application No. 62/148,541, filed on Apr. 16, 2015.

(51) Int. Cl.
G06K 9/00 (2006.01)
G06K 9/18 (2006.01)
G06K 9/32 (2006.01)
G06K 9/62 (2006.01)
G06Q 40/08 (2012.01)

(52) U.S. Cl.
CPC ............ G06K 9/18 (2013.01); G06K 9/3258 (2013.01); G06K 9/6215 (2013.01); G06Q 40/08 (2013.01)

(58) Field of Classification Search
None
See application file for complete search history.

(56) References Cited

U.S. PATENT DOCUMENTS

| 2007/0156468 | A1* | 7/2007 | Gay | G06Q 10/10 705/4 |
| 2016/0019419 | A1* | 1/2016 | Chen | G06K 9/00476 382/113 |
| 2016/0063640 | A1* | 3/2016 | Ellingsworth | G06Q 40/08 701/31.4 |

* cited by examiner

Primary Examiner — Delomia L Gilliard
(74) Attorney, Agent, or Firm — Marshall, Gerstein & Borun, LLP

(57) ABSTRACT

Methods, systems, apparatus, and non-transitory media are described for verifying a vehicle's odometer mileage that is associated with an insurance policy. The described techniques include sending a notification to a mobile computing device requesting an update of the odometer mileage. The notification may be generated in response to the current date being within a threshold number of days prior to the insurance policy's expiration date. In response to the notification, a user may capture an image of the odometer with the mobile computing device, which may also include data indicative of the status of the mobile computing device. One or more optical character recognition (OCR) processes may be applied to the captured image to determine various odometer mileages. Aspects include verifying the odometer mileage when different OCR processes produce the same odometer mileage result and using the status of the mobile computing device to flag potentially fraudulent images.

20 Claims, 6 Drawing Sheets

Odometer History — 480

Please your odometer history below:

February 8, 2014    Odometer: 027123
Time: 9:00am

March 10, 2014    Odometer: 027160
Time: 11:00am

April 14, 2014    Odometer: 028224
Time: 1:00pm

May 17, 2014    Odometer: 029123
Time: 5:00pm

Start your odometer process — 440

Please select your choices below:

[📷] Take a picture
You must be in your vehicle to complete the next 3 steps. — 442

[📷] Review Odometer History
Review your earliest and latest odometer history. — 446

No Vehicle Selected
Select a Vehicle
2011 Nissan Pathfinder
2013 Ferarri 458 Speciale

[ Snap ]

VERIFYING ODOMETER MILEAGE USING CAPTURED IMAGES AND OPTICAL CHARACTER RECOGNITION (OCR)

CROSS-REFERENCE TO RELATED APPLICATIONS

This application claims priority to Provisional Application No. 62/148,541, entitled "Verifying Odometer Mileage using Captured Images and Optical Character Recognition (OCR)," and filed on Apr. 16, 2015, which is incorporated herein by reference in its entirety.

TECHNICAL FIELD

The present disclosure relates generally to methods, apparatus, systems, and non-transitory computer readable media used to verify odometer mileage and, more particularly, to verifying and forecasting annual odometer mileages via one or more captured images of an odometer.

BACKGROUND

In today's insurance industry, automotive insurance customers may enroll in voluntary vehicle mileage reporting initiatives, which may influence an individual's driving risk assessment and qualify a policyholder for insurance premium discounts. Currently, vehicle mileage reporting is performed by sending notifications through postal mail requesting a mileage update from the insured, which may require the insured to manually enter the mileage online. Due to these manual and cumbersome methods of updating the vehicle mileage, insurance policy holders often ignore or overlook reporting vehicle mileage to insurance carriers, which may result in policyholders missing opportunities to receive valuable discounts.

Therefore, it is useful to provide a convenient process to facilitate the reporting of vehicle mileage, but these processes present several challenges.

BRIEF SUMMARY

The present embodiments may relate to capturing an odometer image of one or more vehicles associated with an insurance policy. Each odometer image may be utilized to calculate an odometer mileage, which in turn may be used to update a vehicle mileage associated with the insurer's policy profile. The image may be captured in response to a notification received via a mobile computing device requesting an update of the odometer mileage, which may be generated by one or more external computing devices. The external computing devices may generate the notification in response to the current date being within a threshold number of days prior to the insurance policy's expiration date.

The odometer image may also include status data and/or metadata indicative of the status of the mobile computing device when the image was captured. One or more optical character recognition (OCR) processes may be applied to the captured image, by either the mobile computing device or the external computing device, to calculate various odometer mileages. The odometer mileage may be verified by comparing the calculated odometer mileages from different OCR processes and determining whether the different OCR processes yield the same odometer mileage. The mobile computing device may additionally flag odometer images that are potentially fraudulent and/or that produce different odometer mileage calculations from different OCR processes for manual review.

In one aspect, a computer-implemented method for verifying an odometer mileage corresponding to a vehicle may be provided. A method may include (1) receiving a notification requesting the odometer mileage when the notification is being generated in response to passage of a threshold date prior to expiration of an insurance policy associated with the vehicle; (2) capturing an image of an odometer corresponding to the vehicle in response to the notification; (3) sending the image of the odometer to an external computing device, whereupon the external computing device (i) performs a first and a second optical character recognition (OCR) process on the image of the odometer to calculate a first and a second odometer mileage, respectively, (ii) determines whether the first and the second odometer mileage match to verify the odometer mileage, and/or (iii) updates a user profile associated with the insurance policy to indicate the odometer mileage; and/or (4) displaying a confirmation that the odometer mileage has been verified when the first and the second odometer mileage match. The method may further include using current odometer mileage, or differences in mileage indicating actual vehicle miles or usage during a given time period to adjust or update auto insurance policies, premiums, and/or discounts. As a result, auto insurance policy risk may be more accurately estimated. The method may include additional, fewer, or alternate actions, including those discussed elsewhere herein.

In another aspect, a non-transitory, tangible computer-readable medium storing machine readable instructions in a mobile computing device is described that, when executed by a processor, cause the processor to: (1) receive a notification requesting the odometer mileage when the notification is being generated in response to passage of a threshold date prior to expiration of an insurance policy associated with the vehicle; (2) capture an image of an odometer corresponding to the vehicle in response to the notification; (3) send the image of the odometer to an external computing device, whereupon the external computing device (i) performs a first and a second optical character recognition (OCR) process on the image of the odometer to calculate a first and a second odometer mileage, respectively, (ii) determines whether the first and the second odometer mileage match to verify the odometer mileage, and/or (iii) updates a user profile associated with the insurance policy to indicate the odometer mileage; and/or (4) display a confirmation that the odometer mileage has been verified when the first and the second odometer mileage match. The non-transitory, tangible computer-readable medium may include additional, fewer, or alternate instructions, including those discussed elsewhere herein.

In yet another aspect, a mobile computing device is described that includes a communication unit configured to receive a notification requesting a vehicle odometer mileage, the notification being generated in response to passage of a threshold date prior to expiration of an insurance policy associated with a user account profile corresponding to the vehicle. The mobile computing device may also include an image capture unit configured to capture an image of the vehicle odometer in response to the notification. The communication unit may be further configured to send the image of the odometer to an external computing device, whereupon the external computing device (i) performs a first and a second optical character recognition (OCR) process on the image to calculate a first and a second odometer mileage, respectively, (ii) determines whether the first and the second odometer mileage match to verify the vehicle odometer mileage, and/or (iii) updates the user profile associated with the insurance policy associated with the vehicle to indicate the vehicle odometer mileage. Furthermore, the mobile computing device may also include a graphical processing unit (GPU) configured to display a confirmation that (1) the odometer mileage for the corresponding vehicle has been verified when the first and the second odometer mileage match, and/or (2) the insurance policy for the vehicle has been updated (such as an updated premium or discount based odometer mileage and/or actual vehicle mileage or usage). The mobile computing device may include additional, fewer, or alternate components and/or functionality, including those discussed elsewhere herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF DRAWINGS

The figures described below depict various aspects of the systems and methods disclosed herein. It should be understood that each figure depicts an aspect of a particular aspect of the disclosed system and methods, and that each of the figures is intended to accord with a possible aspect thereof. There are shown in the drawings arrangements which are presently discussed, it being understood, however, that the present aspects are not limited to the precise arrangements and instrumentalities shown, wherein:

FIG. 4A illustrates an exemplary screenshot 400 that may be displayed on a mobile computing device upon starting a mobile computing device application;

FIG. 4B illustrates an exemplary screenshot 440 that may be displayed on a mobile computing device upon a user selecting a vehicle from the list displayed in FIG. 4A;

FIG. 4C illustrates an exemplary screenshot 480 that may be displayed on a mobile computing device upon a user selecting the option to review odometer history from the list of options shown in FIG. 4B;

The figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The present aspects relate to, inter alia, verifying an odometer mileage to update mileage information associated with a user's insurance policy. A mobile computing device may execute one or more algorithms, applications, programs, etc., to facilitate communication with one or more external computing devices and/or to facilitate user interaction with the mobile computing device.

The mobile computing device may communicate with one or more external computing devices to receive a notification and/or a request for an updated odometer mileage. In response to this notification, the user may use the mobile computing device to take a picture of the vehicle's odometer. In some aspects, the mobile computing device may add status data to the captured image to indicate the status of the mobile computing device when the image was taken, which may assist in fraud detection.

The image and any associated status data may be sent to one or more external computing devices, which may apply one or more optical character recognition (OCR) processes to the odometer image to calculate a resulting mileage. Odometer mileage verification may be established when different OCR processes result in the same mileage and no fraudulent properties are detected. Once verified, the external computing device may update the insurance policy profile and send another notification to the mobile computing device, at such point a user may receive an acknowledgement that the odometer mileage associated with his insurance policy profile has been updated. Otherwise, the odometer image may be flagged for further review if the OCR processes provide different mileages and/or the odometer image is potentially fraudulent.

Updated auto insurance policy premiums and discounts may be estimated based upon the actual odometer mileage. For instance, the actual odometer mileage may be compared with a prior odometer mileage to determine vehicle usage or miles driven during a given time period, such as a six month billing period.

An Exemplary Odometer Mileage Verification System

Figure 1:
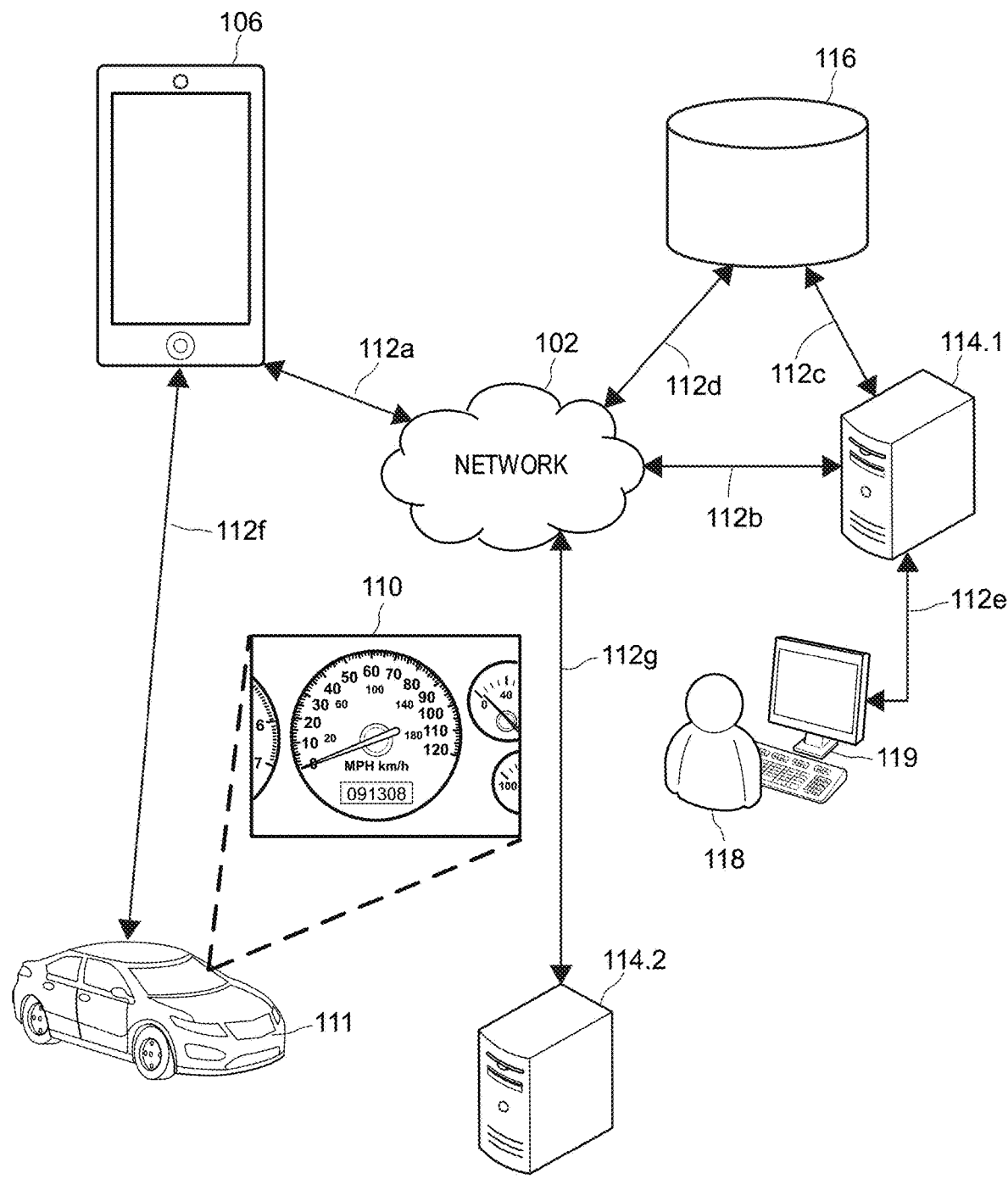
FIG. 1 illustrates a block diagram of an exemplary odometer mileage verification system 100.

FIG. 1 is a block diagram of an exemplary odometer mileage verification system 100. Odometer mileage verification system 100 may include hardware and/or software applications, as well as various data communication channels for facilitating data communications between the various hardware and software components.

The odometer mileage verification system 100 may include a network 102, a mobile computing device 106, an odometer 110 that is associated with a vehicle 111, external computing device 114.1 and/or external computing device 114.2 that may be communicatively coupled to an infrastructure 116, a user 118, and a terminal 119. Odometer mileage verification system 100 may include additional, fewer, or alternate components, including those discussed elsewhere herein.

In one aspect, network 102 may be configured as any suitable network to facilitate communications between mobile computing device 106 and external computing devices 114.1 and/or external computing device 114.2. Network 102 may include any appropriate combination of wired and/or wireless communication networks, and/or data transmission. For example, network 102 may include one or more telecommunication networks and may constitute (i) nodes and/or (ii) links 112a-f used for data and/or communication exchange between various nodes. To provide additional examples, network 102 may include a wireless telephony network (e.g., GSM, CDME, LTE, etc.), a Wi-Fi network (e.g., based upon 802.11x standards) a BLUETOOTH network, one or more proprietary networks, one or more base stations, access points, cellular networks, a secure public internet, a mobile-based network, a virtual private network or some other type of network, such as dedicated access lines, plain ordinary telephone lines, satellite links, a public switched telephone network (PSTN), etc., or any suitable combination thereof. Network 102 may facilitate a connection to the Internet for mobile computing device 106 and/or external computing device 114.1 and/or external computing device 114.2. Additional connections to facilitate a connection to the Internet are not shown in FIG. 1 for purposes of brevity.

In some aspects, mobile computing device 106 may be permanently or removably installed in vehicle 111 (e.g. a car, truck, motorcycle, etc.). Although FIG. 1 illustrates vehicle 111 as an automobile, various aspects include mobile computing device 106 permanently or removably installed in any suitable type of vehicle, such as an automobile, a watercraft, a motorcycle, etc.

Mobile computing device 106 may be configured to communicate with one or more of network 102 and/or vehicle 111 via any number of wired and/or wireless links, such as links 112a and 112f, respectively, for example, via one or more suitable communication protocols, which may be the same communication protocols or different communication protocols as one another. For example, mobile computing device 106 may communicate with vehicle 111 via a BLUETOOTH communication protocol using link 112f while communicating with external computing device 114.1 and/or external computing device 114.2 via a cellular communication protocol using network 102 and links 112a-b and/or links 112a and 112g.

Mobile computing device 106 may be implemented as any suitable type of computing device configured to perform the various functions of the aspects as described herein, such as a smartphone, a tablet computer, a laptop computer, a wearable computing device, smart watch, smart glasses, PDA (personal digital assistant), or any suitable type of mobile device, including computing devices configured for wireless communication and data transmission. Mobile computing device 106 may be configured to execute one or more algorithms, program applications, etc., to receive one or more notifications from external computing device 114.1 and/or external computing device 114.2, to capture an image of odometer 110, to add status data to the image of odometer 110 (which is further discussed below with reference to FIG. 2), to send the image and/or status data to external computing device 114.1 and/or external computing device 114.2, to receive one or more notifications that the odometer mileage has been verified based upon the sent odometer image, to view a history of odometer mileage (e.g., via previously sent odometer images), to view information associated with the user's insurance policy profile that may be stored on infrastructure 116 and accessed via communications between mobile computing device 106 and external computing device 114.1 and/or external computing device 114.2 utilizing network 102, etc.

In some aspects, mobile computing device 106 may be configured to receive one or more notifications from external computing device 114.1 and/or external computing device 114.2 prompting the user to update the odometer mileage information associated with an insurance policy for vehicle 111. In accordance with such aspects, mobile computing device 106 may prompt a user (e.g., an insurance policy holder associated with vehicle 111) to capture an image of odometer 110.

These notifications may be generated by external computing device 114.1 and/or external computing device 114.2 in accordance with any suitable schedule and/or upon any suitable number and type of conditions being satisfied. For example, these notifications may be generated by external computing device 114.1 and/or external computing device 114.2 when the current date is within a threshold number of days prior to expiration of and/or renewal of insurance policy (e.g., 10 days prior, 30 days prior, 60 days prior, etc.). To provide another example, these notifications may be generated by external computing device 114.1 and/or external computing device 114.2 every 30 days, every 45 days, every 60 days, etc. In this way, the odometer mileage that is associated with a policy holder's insurance policy for vehicle 111 may be periodically updated to ensure that the applicable discount mileage conditions (e.g., the policy holder driving vehicle 111 less than some threshold mileage during the coverage period) are being met.

In another aspect, a policy holder may own a plurality of vehicles that are associated with a single insurance policy (e.g. one or more cars, one or more motorcycles, one or more combinations of cars, motorcycles, watercrafts, etc.). In accordance with such aspects, mobile computing device 106 may be configured to receive notifications from external computing device 114.1 and/or external computing device 114.2 for one or more vehicles associated with the insurance policy. The notifications may be consolidated such that a single notification is sent for all applicable vehicles covered under a single policy, or as separate notifications for each vehicle. Mobile computing device 106 may be configured to facilitate a user selecting the vehicle that the captured odometer image corresponds to while responding to the notification.

In one aspect, mobile computing device 106 may be configured to add status data and/or metadata to an image of the odometer that was captured via a camera associated with mobile computing device 106. In some aspects, the metadata may include the status data. In other aspects, the metadata may include the status data and/or any suitable type of data, such as the current date, time, information regarding the environment, the weather conditions, etc. Mobile computing device 106 may be configured to add status data and/or metadata to the image prior to storing the image on mobile computing device 106 and/or prior to sending the image of the odometer to external computing device 114.1 and/or external computing device 114.2.

Mobile computing device 106 may be configured to store data locally, such as collected odometer images from one or more previous mileage reportings, status data and/or metadata associated with the odometer images, a location of mobile computing device 106, policy holder information, logon credentials for a policy holder to access her policy profile via external computing device 114.1 and/or external computing device 114.2, etc. For example, mobile computing device 106 may store user login and password data for a policy holder and/or one or more images of odometer 110 corresponding to vehicle 111.

In some aspects, mobile computing device 106 may perform any suitable number and/or type of optical character recognition (OCR) processes on one or more of the images of the odometer 110 stored locally on mobile computing device 106. For example, mobile computing device 106 may extract information from an image of odometer 110 by performing one or more OCR algorithms on the odometer image. Continuing this example, each OCR process may result in a calculated numeric value, the numeric value representing an odometer mileage of vehicle 111.

In another aspect, mobile computing device 106 may send an image of odometer 110 to external computing device 114.1 and/or external computing device 114.2. In such a case, external computing device 114.1 and/or external computing device 114.2 may perform any suitable number and/or type of optical character recognition (OCR) processes on the odometer image to calculate the odometer mileage of vehicle 111.

In one aspect, mobile computing device 106, external computing device 114.1, and/or external computing device 114.2 may verify the odometer mileage when the odometer mileages calculated via two or more different OCR processes match one another. If the results of the two or more OCR processes do not match, then mobile computing device 106 and/or external computing device 114.1 and/or external computing device 114.2 may generate a manual review flag and append or otherwise add this data to the odometer image. Mobile computing device 106, external computing device 114.1, and/or external computing device 114.2 may store the odometer image (with or without the manual review flag) in infrastructure 116.

External computing device 114.1 and/or external computing device 114.2 may be implemented as any suitable type of device to facilitate the various functions in accordance with the aspects described herein. In some aspects, external computing device 114.1 and/or external computing device 114.2 may be configured to execute various software applications, algorithms, and/or suitable programs facilitate one or more functions associated with odometer mileage verification system 100 as described herein. For example, external computing device 114.1 and/or external computing device 114.2 may be implemented as a network server, a webserver, a database server, a file server, a personal computer, a laptop, a smartphone, other mobile device, one or more database and/or storage devices, or any suitable combination thereof.

External computing device 114.1 and/or external computing device 114.2 may be configured to communicate with mobile computing device 106, infrastructure 116, and/or terminal 119 via any suitable number and/or type of communication protocols, which may be the same communication protocols or different communication protocols. Communications between mobile computing device 106, external computing device 114.1, external computing device 114.2, infrastructure 116, and/or terminal 119 may result in any suitable type of data being transferred between any suitable combination of these devices, and may be implemented with any suitable number and/or type of wired and/or wireless links (e.g., links 112*a-e*).

In various aspects, external computing device 114.1 and/or external computing device 114.2 may communicate with mobile computing device 106 and/or infrastructure 116 via network 102 (e.g., utilizing links 112*a* and/or 112*b* and 112*d*). In other aspects, external computing device 114.1 and/or external computing device 114.2 may communicate with infrastructure 116 directly (e.g., utilizing link 112*c*), bypassing network 102.

In some aspects, external computing device 114.1 and/or external computing device 114.2 may be configured to perform any suitable portion of processing functions remotely that may be outsourced by mobile computing device 106. For example, mobile computing device 106 may capture one or more odometer images and send the one or more captured odometer images to external computing device 114.1 and/or external computing device 114.2 for remote OCR processing instead of performing the OCR processing locally.

In various aspects, external computing device 114.1 and/or external computing device 114.2 may perform one or more actions when a manual review flag has been generated. For example, external computing device 114.1 and/or external computing device 114.2 may send a notification to mobile computing device 106 that the policy profile has not been updated with the odometer mileage reported via the odometer image, that an odometer image has failed verification, that an odometer image is potentially fraudulent, that manual review of the odometer image is required, that the user should call an insurer telephone number to manually validate the odometer mileage, etc.

To provide another example, external computing device 114.1 and/or external computing device 114.2 may send a notification to one or more other external computing devices, which may or may not be part of infrastructure 116. These notifications may be sent in accordance with any suitable type of format such as email messages, text messages, etc., based upon the device to which the notification is sent. For example, external computing device may send an internal notification to user 118 via terminal 119, which may be implemented as any suitable type of computing device such as, for example, a desktop workstation. User 118 may be, for example, an insurance employee trained to perform manual review of odometer images that fail validation and/or to forward odometer images to the appropriate personnel for manual review. One or more portions of infrastructure 116 may be implemented as one or more storage devices that are physically co-located with the external computing device 114.1 and/or external computing device 114.2 or as a shared database structure (e.g. comprising data storage using cloud computing technology). FIG. 1 illustrates external computing device 114.1 and/or external computing device 114.2 coupled directly to infrastructure 116 for purposes of brevity. But in various aspects, external computing device 114.1 and/or external computing device 114.2 may be coupled to infrastructure 116 via any suitable network, such as via network 102 or other networks not shown in FIG. 1.

In accordance with such aspects, external computing device 114.1 and/or external computing device 114.2 may be configured to access infrastructure 116 via a network such that infrastructure 116 and/or external computing device 114.1 and/or external computing device 114.2 need not be co-located. For example, external computing device 114.1 and/or external computing device 114.2 may access infrastructure 116 via a connection to the Internet to download relevant policy holder information. To provide another example, external computing device 114.1 and/or external computing device 114.2 may access infrastructure 116 via a local, secure connection to download relevant policy holder information.

In some aspects, external computing device 114.1 and external computing device 114.2 may be part of the same infrastructure as infrastructure 116. For example, in accordance with such aspects, external computing device 114.1 and external computing device 114.2 may each be part of an insurance provider infrastructure, but facilitate different functions. For example, external computing device 114.2 may be implemented as an insurance provider remote server and may be configured to perform one or more OCR processes on a received odometer image.

Continuing the previous example, if a received odometer image has been flagged for manual review (e.g., the image is potentially fraudulent, the odometer mileage calculated from different OCR processes do not match, the odometer mileage cannot be calculated from odometer image due to image quality, etc.) aspects include external computing device 114.2 transmitting the flagged odometer image (or the odometer image and a separate manual flag indication) to external computing device 114.1. Upon receiving the odometer image in such a way, aspects include user 118 performing the review via terminal 119 and external computing device 114.1.

External computing device 114.1 and external computing device 114.2 may perform any combination of manual and automated functions. For example, either external computing device 114.1 or external computing device 114.2 may be configured to facilitate OCR processes, mileage calculations, policy updating, sending reminder notifications, and/or be utilized for manual review, which is further discussed below.

In other aspects, external computing device 114.1 and external computing device 114.2 may each represent external computing devices of different infrastructures. For example, external computing device 114.2 may be implemented as an insurance provider remote server and may be configured to perform one or more OCR processes on a received odometer image, while external computing device 114.1 may be part of a third-party infrastructure, a party contracted by the insurance provider, etc. Continuing this example, flagged odometer images may be reviewed by user 118 as instructed by the insurance provider.

In some aspects, OCR processes may be omitted and odometer images be manually reviewed via one or more users accessing external computing device 114.1 and/or external computing device 114.2. For example, upon submission of an odometer image, a mechanical turk system may be implemented whereby one or more users view the odometer image on a respective external computing device, determine an odometer mileage from the odometer image, submit the determined odometer mileage to one or more insurer employees, cause the insurer's policy profile to be updated with the odometer mileage as the reported mileage, etc.

For example, the manual review process in accordance with such aspects may include separate users performing a manual review of the odometer image without an OCR process being performed. A separate user from 118 is not shown in FIG. 1 for purposes of brevity, but aspects may include any suitable number of users performing manual reviews of one or more received odometer images, each of whom may utilize external computing device 114.1, external computing device 114.2, and/or one or more additional external computing devices (also not shown in FIG. 1 for purposes of brevity) to do so. Continuing this example, the separate users may submit their respective determined odometer mileages to one or more of external computing device 114.1 and/or external computing device 114.2, respectively.

In accordance with such aspects, the manual review flag may be generated based upon the result of the manual determinations of odometer mileage instead of the result of the odometer mileages calculated via one or more OCR processes. That is, such aspects include the manual review flag being generated when two or more manual odometer mileage determinations do not match one another. In accordance with such aspects, a third manual review (by a separate user or one of the same users who performed the first two reviews) may be conducted to resolve this inconsistency and result in a verified odometer mileage from the odometer image.

In various aspects, the odometer mileage may be verified using any suitable combination of automated and/or manual processes. For example, mobile computing device 106, external computing device 114.1, and/or external computing device 114.2 may perform two or more separate OCR processes whereby the odometer image is manually reviewed when the calculated results do not match, thereby eliminating manual review when the calculated odometer mileage from the two or more OCR processes do match. To provide another example, an additional user may independently review an odometer image when the determined results from two separate users do not match, eliminating the need for additional review when the determined odometer mileages do match. In this way, the various combinations of automated and manual review processes may facilitate a system in which the verified odometer mileage is more reliable than one calculated via a single OCR process and/or a single manual review process.

Regardless of how the odometer mileage is verified, aspects include utilizing the verified odometer mileage to perform various acts. For example, external computing device 114.1 and/or external computing device 114.2 may access a user profile and use the verified odometer mileage as the current odometer mileage. To continue this example, external computing device 114.1 and/or external computing device 114.2 may use the current mileage to adjust the miles driven during a certain time period, to adjust or update auto insurance policies, premiums, and/or discounts, etc. As a result, auto insurance policy risk may be more accurately estimated.

Although illustrated as single devices in FIG. 1, in various aspects, external computing device 106 and/or external computing device 114.1 and/or external computing device 114.2 may include any suitable number of computing devices. In accordance with such aspects, each computing device may include one or more CPUs and be configured to operate independently of the other computing devices. Computing devices operating as a group may process requests from other computing devices individually (e.g., based upon their availability) and/or concurrently (e.g., parallel processing). Computing devices operating as a group may process requests from other computing devices in a prioritized and/or distributed manner. For example, an operation associated with processing a request may be performed on one computing device while another operation associated with processing the same request (or a different request) is performed on another computing device.

Exemplary End-User/Destination Devices

Figure 2:
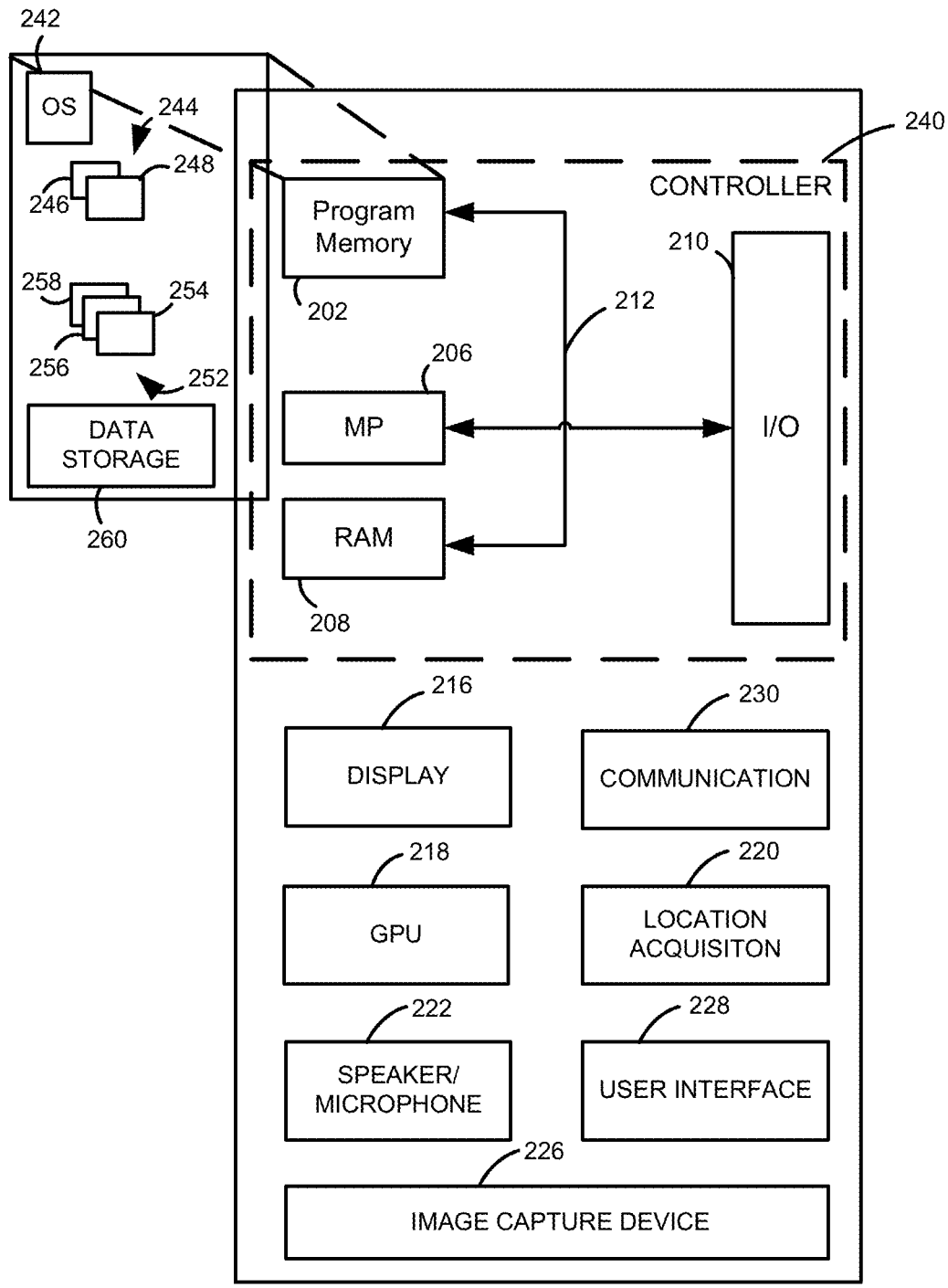
FIG. 2 illustrates a block diagram of an exemplary mobile computing device 200.

FIG. 2 illustrates a block diagram of an exemplary mobile computing device 200. In one embodiment, mobile computing device 200 is an implementation of mobile computing device 106, as shown in FIG. 1. Mobile computing device 200 may include a controller 240, a display 216, a communication unit 230, a graphics processing unit (GPU) 218, a location acquisition unit 220, a speaker/microphone 222, an image capture device 226, and a user interface 228.

The controller 240 may include a program memory 202, one or more of a microprocessor (MP) 206, a random-access memory (RAM) 208, and an input/output (I/O) interface 210, each of which may be interconnected via an address/data bus 212.

In various aspects, program memory 202 may be implemented as a non-transitory tangible computer readable media configured to store computer-readable instructions, that when executed by controller 240, cause controller 240 to perform various acts. For example, program memory 202 may include an operating system 242, one or more software applications 244, and/or one or more software routines 252. Program memory 202 may be configured to include other portions to store data that may be read from and written to by MP 206, such as data storage 260, for example.

In various aspects, program memory 202 and/or RAM 208 may be implemented as any suitable type of memory, such as non-transitory computer readable memories, semiconductor memories, magnetically readable memories, and/or optically readable memories, for example. MP 206 may be configured to execute one or more of operating system (OS) 242, software applications 244, software routines 252, and/or other software applications to facilitate the various aspects described herein.

The operating system 242 may be implemented as any suitable operating system platform depending on the particular implementation of mobile computing device 200. For example, operating system 242 may be implemented as one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 260 may store data used in conjunction with one or more functions performed by mobile computing device 200 to facilitate the interaction between mobile computing device 200 and one or more other devices, such as between mobile computing device 200 and one or more networks (e.g., network 102), vehicles (e.g., vehicle 111), one or more external computing devices (e.g., external computing device 114.1 and/or external computing device 114.2), etc. In some aspects, controller 240 may be configured to communicate with additional data storage mechanisms that are not shown in FIG. 2 for purposes of brevity (e.g., one or more hard disk drives, optical storage drives, solid state storage devices, etc.) that reside within or are otherwise associated with mobile computing device 200.

In one aspect, data storage 260 may store data such as application data for the one or more software applications 244, routine data for the one or more software routines 252, user policy profile information such as user identification, a user password, user name, and/or a userid, vehicle identifications, odometer images and/or odometer history data for a particular vehicle (which may include multiple odometer images stored on mobile computing device 200 over time), a phone number corresponding to mobile computing device 200, etc.

Display 216 may be implemented as any suitable type of display and may facilitate user interaction with mobile computing device 200 in conjunction with user interface 228. For example, display 216 may be implemented as a capacitive touch screen display, a resistive touch screen display, etc. In various aspects, display 216 may be configured to work in conjunction with controller 240 and/or GPU 218 to display information in accordance with the various aspects described herein, such as instructions for taking a picture of a vehicle odometer, a history of vehicle odometer mileage, user policy profile information, a confirmation that a vehicle odometer mileage has been verified, auto insurance premium or discount information, other auto insurance information, coverages, deductibles, etc.

Image capture device 226 may be implemented as a camera integrated as part of mobile computing device 200, a peripheral camera, a webcam, a camera installed inside a vehicle, a camera installed outside a vehicle, etc. In aspects in which image capture device 226 is implemented as a device external to device 200, image capture device 226 may be configured to communicate with device 200, for example, to send captured images to device 200. In various aspects, image capture device 226 may use one or more orientations, zoom levels, effects, etc., to capture photos of odometer mileage (e.g., using a wide-angle view to photo dashboard including odometer mileage).

Communication unit 230 may be configured to facilitate communications between mobile computing device 200 and one or more other devices, as previously discussed above with reference to FIG. 1. In various aspects, communication unit 230 may be configured to support any suitable number and/or type of communication protocols based upon a particular network and/or device with which mobile communication device 200 is communicating. For example, communication unit 230 may support communications in accordance with communication protocols such as cellular communication protocols (e.g., GSM, CDMA, LTE), communication protocols utilizing Wi-Fi 802.11 standards, WiMAX, near field communication (NFC) standards (e.g., ISO/IEC 18092, standards provided by the NFC Forum), BLUETOOTH communication protocols, etc.

In one aspect, communication unit 230 may be configured to support separate or concurrent communications, which may be the same type of communication protocol or different types of communication protocols. For example, communication unit 230 may be configured to facilitate communications between mobile computing device 200 and an external computing device (e.g., external computing device 114.1 and/or external computing device 114.2) via a cellular communications protocol while facilitating communications between mobile computing device 200 and a vehicle (e.g., vehicle 111) in accordance with a BLUETOOTH communication protocol.

In various aspects, communication unit 230 may transmit any suitable type of data to one or more external computing devices (e.g., external computing device 114.1 and/or external computing device 114.2). For example, communication unit 230 may transmit one or more portions of status data and/or metadata with the one or more odometer images as separate (concurrent or subsequent) data transmissions. To provide another example, communication unit 230 may transmit the one or more odometer images including one or more portions of status data and/or metadata. To provide another example, communication unit 230 may transmit insurance policy information such as a policy number, a time and date stamp, vehicle information (e.g., a make, model, and year of the vehicle), user profile information (e.g., logon credentials, a user id), etc.

Location acquisition unit 220 may be configured to utilize any suitable number and/or types of communication protocols to facilitate the determination of a geographic location of mobile computing device 200. For example, location acquisition unit 220 may communicate with one or more satellites and/or wireless transmitters to determine a location of mobile computing device 200. In one aspect, location acquisition unit 220 may utilize a satellite Global Positioning System (GPS), an Assisted Global Positioning System (A-GPS), or any other suitable global positioning protocol (e.g., the GLONASS system operated by the Russian government, the Galileo system operated by the European Union, etc.) to determine a geographic location of mobile computing device 200.

The location acquisition unit 220 may periodically store, as part of the status data and/or metadata, one or more locations of mobile computing device 200 in any suitable portion of program memory 202 (e.g., data storage 260, external computing device 114.1 and/or external computing device 114.2, etc.). In this way, location acquisition unit 220 may track the location of mobile computing device 200 over time and store these locations as part of the status data and/or metadata, which may be stored with the one or more odometer images or separate from the one or more odometer images. As will be further discussed below, this location data may be used for fraud detection.

In one aspect, one of the one or more software applications 244 may be an odometer mileage updating application 246, which may be implemented as a series of machine-readable instructions for performing the various tasks associated with executing one or more aspects described herein. Odometer mileage updating application 246 may cooperate with one or more other hardware or software portions of mobile computing device 200 to facilitate these functions.

For example, odometer mileage updating application 246 may work in conjunction with one or more of routines 252 and/or other software applications 244 to perform one or more functions of the aspects as described herein. Odometer mileage updating application 246 may include instructions for performing tasks such as, for example, receiving user policy profile information from an external computing device (e.g., external computing device 114.1 and/or external computing device 114.2), displaying one or more notifications, reminders, and/or instructions to update a user's policy profile information with a new odometer mileage reading, capturing one or more images of an odometer, storing one or more images of an odometer to a suitable portion of data storage 260 and/or to another device (e.g., an external computing device), adding status data and/or metadata to one or more captured and/or stored odometer images, sending one or more odometer images to an external computing device, flagging potentially fraudulent odometer images, generating a failed odometer image validation indicator, displaying user and/or policy information, a history of odometer mileage, facilitating communications between mobile computing device 200 and one or more other devices in conjunction with communication unit 230, etc.

One of the one or more software applications 244 may be a web browser 248. In some aspects, web browser 248 may be a native web browser application, such as Apple's Safari®, Google Android™ mobile web browser, Microsoft Internet Explorer® for Mobile, Opera Mobile™, etc. In other aspects, web browser 248 may be implemented as an embedded web browser.

Regardless of the implementation of web browser 248, various aspects include web browser 248 being implemented as a series of machine-readable instructions that, when executed by MP 206, result in mobile computing device 200 receiving, interpreting, and/or displaying web page content from an external computing device (e.g., external computing device 114.1 and/or external computing device 114.2). This web page content may be utilized, for example, in conjunction with odometer mileage updating application 246 to perform one or more functions of the aspects as described herein.

In one aspect, one of the one or more software routines 252 may include a data read/write routine 254. Data read/write routine 254 may include instructions, that when executed by MP 206, cause MP 206 to collect, measure, sample, generate, and/or store various types of data used by odometer mileage updating application 246. This data may be stored as part of the status data and/or metadata in any suitable portion of computing device 200 (e.g., in data storage 260 and/or RAM 208) and/or to an external computing device, which may be accessed by odometer mileage updating application 246 as needed.

To provide an illustrative example, data read/write routine 254 may include instructions that, when executed by MP 206, cause MP 206 to store geographic location data generated by location acquisition unit 220 in data storage 260. Continuing this example, data read/write routine 254 may include instructions to cause MP 206 to store a log of a time and/or a geographic location of mobile computing device 200 when each odometer image was captured by image capture device 226, which may be added to the one or more captured odometer images as embedded metadata, for example.

Once one or more odometer images are captured, various aspects include the calculation of the odometer mileage by applying one or more OCR processes to the one or more captured odometer images. Again, in some aspects, mobile computing device 200 may offload this processing via communications with an external computing device, which is further discussed with reference to FIG. 3. But in other aspects, however, mobile computing device 200 may perform this processing locally.

In accordance with local processing aspects, mobile computing device 200 may include one or more OCR routines 256. OCR routines 256 may include instructions that, when executed by controller 240, cause mobile computing device 200 to perform an OCR process on one or more captured odometer images. In various embodiments, OCR routines 256 may include instructions to implement any suitable number and/or type of OCR processes, which may be the same type of OCR process (e.g., to process multiple odometer images simultaneously with the same applied OCR process) or different types of OCR processes (e.g., to process one odometer image using different types of OCR processes).

In an aspect, one or more of OCR routines 256 may include instructions that, when executed by MP 206, facilitate one or more machine learning techniques to improve the accuracy of calculated odometer mileages over time. For example, a log or history of the odometer mileage updating process may be stored locally on mobile computing device 200 (e.g., in data storage 260) and/or on an external computing device (e.g., infrastructure 116).

In various aspects, the log or history of the odometer mileage updating process may include data such as, for example, a history of captured odometer images, a history of calculated odometer mileages, data indicating whether the odometer images were verified, how many steps were taken to verify the odometer images, a history of manual reviews, whether an odometer mileage has been verified via a mechanical turk process, whether an odometer mileage was initially verified via two or more OCR processes resulting in the same odometer mileage or needed to be manually verified, etc.

In an aspect, one or more of OCR routines 256 may include instructions that, when executed by MP 206, facilitate one or more machine learning techniques using the log or history of the odometer mileage updating process to update the instructions stored in one or more of OCR routines 256. In this way, one or more of OCR routines 256 may include instructions that dynamically adapt over time to provide more accurate odometer mileage calculations via one or more OCR processes.

For example, one or more of OCR routines 256 may include instructions that, when executed by MP 206, facilitate the use of any suitable number and/or type of recognition techniques, such as pattern recognition, image recognition, object recognition, etc. One or more OCR routines 256 may utilize such recognition techniques to adapt the one or more subsequent OCR processes. By adapting the OCR calculation process, a subsequently calculated odometer mileage may be matched to a previously verified odometer mileage based upon similarities in portions of the two odometer images.

To provide an illustrative example, portions of a first odometer image may have a particular pixilation pattern, color scheme, colormap, etc., as one or more portions of a second, subsequently processed odometer image. These portions may include, for example, parts of the odometer image that include one or more odometer mileage digits. The log or history of the odometer mileage updating process may reveal that the first image was flagged for manual review, which ultimately resulted in an odometer mileage of M1 miles.

In accordance with an aspect, one or more of OCR routines 256 may include instructions that, when executed by MP 206, facilitate the execution of any suitable number and/or type of recognition techniques to determine matches between one or more similar portions the first and second images. If a match is found between one or more portions of these images, one or more digits from the odometer mileage calculation may be applied to one or more corresponding digits of the second odometer image matching these portions. In this way, subsequent OCR processes may improve upon the accuracy of previous ones, and may potentially avoid the need for manual review processes or other odometer mileage verification steps.

In an aspect, OCR routines 256 may include two different OCR routines, one corresponding to an OCR matrix matching technique and another corresponding to a different OCR processing technique, such as feature extraction, adaptive recognition, etc. Continuing this example, OCR routines 256 may enable mobile computing device 200 to perform a first OCR process in accordance with a first OCR technique and a second OCR process in accordance with a second, different type of OCR technique, with each different OCR process independently calculating an odometer mileage from the same odometer image.

In some aspects, odometer mileage updating application 246 may determine an odometer mileage from a single OCR process implemented by the instructions stored in an OCR routine 256. But in other aspects, odometer mileage updating application 246 may verify the odometer mileage by comparing the first and second odometer mileages calculated via two different OCR processes.

If the odometer mileages match, then odometer mileage updating application 246 may generate an OCR validation indication as part of the status data (which may be stored as part of the odometer image as metadata), notify the user (e.g., via display 216) that the odometer mileage has been verified, display the verified odometer mileage, communicate the odometer mileage to an external computing device so the insurer's profile may be updated accordingly, etc.

In this way, the two-step OCR odometer mileage calculation may facilitate the verification of the odometer mileage without requiring manual review. Because the two separate OCR processes may implement different types of OCR, such aspects provide an efficient process to reliable verify a calculated odometer mileage, as manual review may be necessary when the different OCR processes calculate different odometer mileages, but otherwise is unnecessary.

If the odometer mileages do not match, various aspects include odometer mileage updating application 246 generating a failed OCR validation indicator (which may be stored as part of the odometer image as metadata), notifying the user (e.g., via display 216) and/or communicating the failed OCR validation indication to an external computing device, which may include one or more manual review flags, for example.

In one aspect, a failed OCR validation indication may act as a manual review flag to indicate that the associated odometer image is to be manually reviewed when sent to an external computing device (e.g., by insurance personnel). In local OCR processing aspects, the failed OCR validation indication may act as a trigger to reset one or more processes, such as prompting the user to capture another odometer image, for example.

In aspects in which mobile computing device 200 offloads OCR processing to one or more external computing devices, odometer mileage updating application 246 may cause mobile computing device 200 to display an indication received from the external computing device that the odometer mileage could not be validated. That is, when the external computing device determines a mismatched odometer mileage calculation from various different OCR processes, the external computing device may generate and send the notification indicating this to mobile computing device 200, which is further discussed below with reference to FIG. 3. In accordance with such aspects, mobile computing device 200 may receive a notification indicating this from the external computing device in any suitable manner, such as via a text message, a pop-up onscreen notification display, a push notification, etc.

The image validation routine 258 may include instructions to facilitate the detection of a fraudulent odometer reporting utilizing various types of data. Upon detection of a potential fraudulent odometer image, an indication of the potential fraudulent reporting such as a manual review flag, for example, may be stored as part of the status data in any suitable portion of computing device 200 (e.g., in data storage 260 and/or RAM 208) and/or to an external computing device (e.g., infrastructure 116), which may be accessed by odometer mileage updating application 246 as needed. Additionally or alternatively, the indication of the potential fraudulent reporting may be stored as part of the odometer image as metadata. In this way, upon receipt of the potential fraudulent data indicator, the appropriate personnel (e.g., insurance employees) may follow up as needed to further investigate.

In one aspect, image validation routine 258 may include instructions to facilitate the storage of an indication of other devices in which mobile computing device 200 is connected to and/or devices in which mobile computing device 200 is communicating as part of the status data. For example, if mobile computing device 200 is paired with a vehicle via a BLUETOOTH communication protocol, then image validation routine 258 may cause a communication status indicator of to be stored in a suitable portion of data storage 260, in another device (e.g., an external computing device such as external computing device 114.1 and/or external computing device 114.2, as shown in FIG. 1), and/or as metadata included in the odometer image.

This indicator may include data having any suitable format and/or information indicating the communication status of mobile computing device 200, such as a log of connection times, a timestamp of connection times, a name of the connection, media access controller (MAC) addresses of the devices in which mobile computing device 200 is connected, a description of the device in which mobile computing device 200 is connected, a service set identification (SSID) of one or more devices in which mobile computing device 200 is connected, etc. In this way, the status data and/or metadata may indicate a log of the communication status of mobile computing device 200 over one or more periods of time.

Image validation routine 258 may facilitate the detection of a fraudulent odometer reporting in various ways. Again, the status data may include an indication of whether mobile computing device 200 was in communication with a relevant vehicle (e.g., via a BLUETOOTH connection) when the odometer image was captured via image capture device 226. In this way, image validation routine 258 may provide valuable information for determining whether a user was located inside of a relevant vehicle (or at least in close proximity to a vehicle) when the odometer image was captured.

In another aspect, image validation routine 258 may facilitate the storage of geographic location data as part of the status data and/or metadata. The geographic location data may include, for example, a timestamp when the odometer image was captured and/or a correlated geographic location of mobile computing device 200. Because the user's policy profile information typically includes an address associated with where the insured vehicle is kept, image validation routine 258 may facilitate the accessing and comparing of this address (e.g., via an external computing device and/or via locally stored user policy profile information) to the status data to determine whether a user was located at the address when the odometer image was captured.

In still another aspect, image validation routine 258 may include instructions, that when executed by controller 240, perform one or more image analyses to determine whether an odometer image is authentic or has been modified. In accordance with such aspects, image validation routine 258 may facilitate the execution of any suitable number and/or type of routines to identify whether a user has tampered with the odometer image. This may include, for example, any suitable image forensic techniques, edge detection techniques, image error level analyses, colored layer analyses, compression analyses, etc.

In accordance with the various fraud detection aspects, image validation routine 258 may include instructions that facilitate the identification or flagging of an odometer image as fraudulent based upon any suitable combination of fraud detection techniques. For example, image validation routine 258 may include instructions to identify and/or flag an odometer image as being potentially fraudulent when the status data indicates that mobile computing device 200 was not in communication with the vehicle and was likewise not located at the address associated with the insurer's user profile when the odometer image was captured.

To provide another example, image validation routine 258 may include instructions to facilitate the identification and/or flagging of an odometer image as fraudulent when the result of an image analysis indicates that an odometer image has been digitally modified (e.g., via graphics editing software).

To provide yet another example, image validation routine 258 may include instructions to facilitate the identification and/or flagging of an odometer image as fraudulent when the status data indicates that mobile computing device 200 was not in communication with the vehicle, was not located at the address associated with the insurer's user profile when the odometer image was captured, and the result of the image analysis yields the detection of a modified odometer image.

In some aspects, one or more of software applications 244 and/or software routines 252 may reside in program memory 202 as default applications that may be bundled together with the OS of mobile computing device 200. For example, web browser 248 may be part of software applications 244 that are included with OS 242 implemented by device 200.

In other aspects, one or more of software applications 244 and/or software routines 252 may be installed on mobile computing device 200 as one or more downloads, such as an executable package installation file downloaded from a suitable application store via a connection to the Internet. For example, odometer mileage updating application 246, data read/write routine 254, one or more OCR routines 256, and/or image validation routine 258 may be stored to suitable portions of program memory 202 upon installation of a package file downloaded in such a manner. Examples of package download files may include downloads via the iTunes store, the Google Play Store, the Windows Phone Store, downloading a package installation file from another computing device, etc. Once downloaded, odometer mileage updating application 246 may be installed on device 200 as part of an installation package such that, upon installation of odometer mileage updating application 246 on mobile computing device 200, data read/write routine 254, one or more OCR routines 256, and/or image validation routine 258 may also be installed.

Although FIG. 2 depicts one program memory 202, one MP 206, and one RAM 208, controller 240 may include any suitable number and/or type of program memories, microprocessors, and/or RAM. Furthermore, although FIG. 2 depicts I/O interface 210 as a single block, various aspects of I/O interface 210 may include any suitable number and/or types of I/O interfaces.

Figure 3:
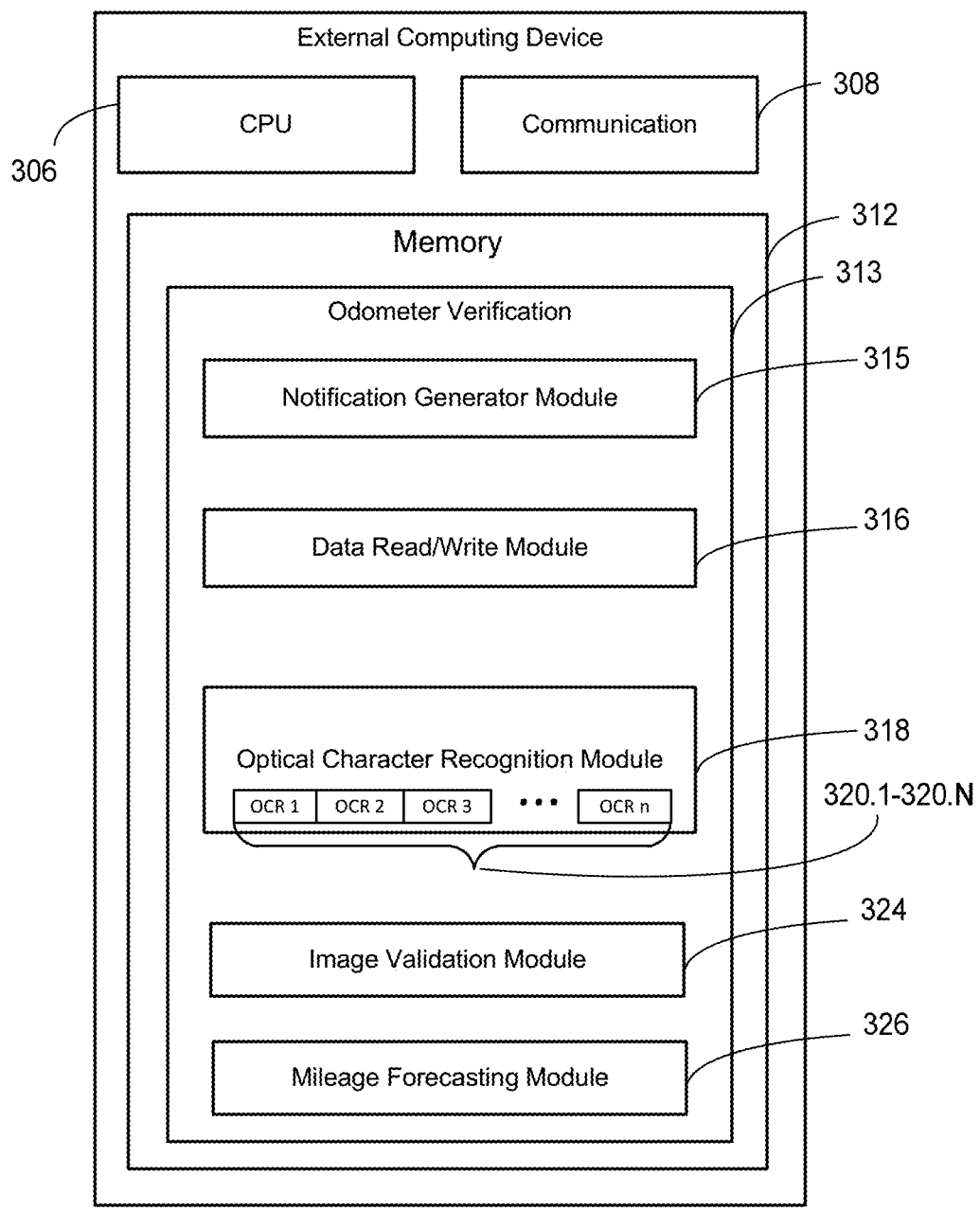
FIG. 3 illustrates a block diagram of an exemplary external computing device 300.

FIG. 3 illustrates a block diagram of an exemplary external computing device 300. In one aspect, external computing device 300 is an implementation of external computing device 114.1 and/or external computing device 114.2, as shown in FIG. 1. In another aspect, external computing device 300 may include a central processing unit (CPU) 306, a communication unit 308, and a memory 312.

In various aspects, external computing device 300 may perform substantially similar functions as mobile computing device 200. For example, a user may take an odometer image with mobile computing device 200 and send the odometer image to external computing device 300. Continuing this example, external computing device 300 may receive the odometer image and any associated status data, metadata, policy information, vehicle information, time and date stamps, etc., perform one or more OCR processes, determine whether various OCR processes calculate the same odometer mileage, determine whether the odometer image is potentially fraudulent, flag the odometer image for manual review when separate OCR processes do not match, update a user profile with the calculated odometer mileage as the current mileage, adjust or update auto insurance policies, premiums, and/or discounts, etc.

CPU 306 may be configured to communicate with memory 312 to store data to and read data from memory 312. Memory 312 may have a structure substantially similar to program memory 202 and, when the various modules stored in memory 312 are executed by CPU 306, may provide substantially the same functionality as the various modules stored in program memory 202 when executed by MP 206; therefore, only differences between program memory 202 and memory 312 will be further described.

Memory 312 may include an odometer verification application 313 and one or more memory modules utilized by odometer verification application 313 such as a notification generator 315, a data read/write module 316, an OCR module 318, an image validation module 324, and a mileage forecasting module 326. Odometer verification application 313 may work in conjunction with the one or more modules to perform one or more functions of the aspects as described herein.

The odometer verification application 313 may include instructions that, when executed by CPU 306, facilitate the implementation of a web-based and/or mobile-based application. This application may be utilized, for example, in conjunction with an insurer infrastructure to maintain policy profile information up-to-date. In such a case, one or more policy holders may communicate with external computing device 300 (e.g., via their respective mobile computing devices 200) to login and view their respective policy profiles, which may include, for example, insurer contact information, policy information, risk assessment information, a current odometer mileage for each insured vehicle, a history of odometer reporting of each vehicle, a listing of insurance policies and/or insured vehicles, etc.

The insurer profile data may be stored as part of an insurer infrastructure (e.g., infrastructure 116) and accessed via external computing device 300 as users interact with the web-based application supported by odometer verification application 313. Communication unit 308 has a structure substantially similar to communication unit 230 and provides substantially the same functionality as communication unit 230; therefore, only differences between communication unit 230 and communication unit 308 will be further described.

In various aspects, communication unit 308 may be configured to facilitate data communications between external computing device 300, one or more mobile computing devices (e.g., mobile computing device 200), one or more infrastructures and/or databases (e.g., infrastructure 116), and/or one or more terminals (e.g., terminal 119). Communication unit 308 may perform such communications directly or indirectly (e.g., via network communications).

Communication unit 308 may send data to and receive data from a mobile computing device including, for example, one or more odometer images, insurance policy data, policy holder data (e.g., login credentials identifying the policy holder), status data and/or metadata associated with the one or more odometer images, etc.

Communication unit 308 may additionally or alternatively communicate with one or more infrastructures to store data to and retrieve data from infrastructure devices. Examples of data transferred between external computing device 300 and one or more infrastructure devices may include, for example, any suitable data sent to and/or received from one mobile computing devices as previously discussed above, an indication that an odometer image having a manual review flag associated therewith has been resolved (e.g., once manual review has been completed), the odometer mileage determined from the resolution of one or more manual reviews, a calculated odometer mileage via one or more OCR processes (e.g., performed via execution of OCR module 316), a history of odometer mileages, etc.

The CPU 306 may execute instructions stored in notification generator module 315 to generate notifications to one or more policy holders via communication unit 308. CPU 306 may execute instructions stored notification generator 310 to query one or more infrastructure devices for information related to one or more policy holders. In this way, CPU 306 may cause a notification message to be sent via communication 306 to one or more mobile computing devices upon the passage of a threshold date prior to expiration of a policy holder's insurance policy.

For example, notification generator module 315 may include instructions that cause communication unit 308 to query one or more infrastructure devices for the policies that are due to expire within the next N days, and generate a notification message via communication unit 308 to mobile device 200 when N is less than some threshold day value. In various aspects, the reminder notifications may be sent via any suitable format (e.g., text messages, e-mail, push notifications, etc.) and may remind the one or more policy holders to report their odometer mileage by capturing an odometer image. To provide an illustrative example, an insurance policy holder who participates in a mileage-based incentive plan may receive a push notification on his mobile computing device from his insurance policy carrier to capture an odometer image for a vehicle associated with the policy 30 days before the policy is to expire, or every 30 days, every 90 days, etc. Upon receipt of the notification, the policy holder may capture an odometer image and transmit the odometer image back to external computing device 300. Upon receipt of the odometer image, external computing device 300 may calculate the odometer mileage via one or more OCR processes, as further discussed below.

Additionally or alternatively, notification generator module 315 may include instructions that, when executed by CPU 306, causes communication unit 308 to send notifications to one or more mobile computing devices indicative of an odometer calculation result. For example, upon receiving an odometer image, external computing device 300 may calculate an odometer mileage from one or more separate OCR processes. The result of these calculations may or not match one another, as previously discussed with respect to mobile computing device 200 shown in FIG. 2.

If the calculations match, then aspects include communication unit 308 updating the policy profile information in the one or more infrastructure devices and/or sending a notification to the mobile computing device that the odometer mileage has been successfully updated.

If the calculations do not match (or if the odometer image is otherwise flagged as being potentially fraudulent) then aspects include communication unit 308 sending a relevant notification to insurance personnel, updating the policy profile information to indicate the status of the odometer image as being potentially fraudulent, and/or sending a notification to the mobile computing device that the odometer image has been flagged for review.

CPU 306 may execute instructions stored in data read/write module 316 to perform acts substantially similar to those performed by MP 206 when executing instructions stored in read/write routine 254; therefore, only differences between the functionality resulting from the execution of read/write routine 254 and data read/write module 316 will be further described.

In one aspect, CPU 306 may execute instructions stored in data read/write module 316 to read data from and/or to write data to one or more insurer infrastructures via communication unit 308. For example, CPU 306 may execute instructions stored in data read/write module 316 to facilitate communication unit 308 accessing one or more insurer infrastructures to verify relevant data received from a mobile computing device. To provide another example, CPU 306 may execute instructions stored in data read/write module 316 to facilitate communication unit 308 to update and/or overwrite data stored in one or more insurer infrastructures.

CPU 306 may execute instructions stored in OCR module 318 to perform acts substantially similar to those performed by MP 206 when executing instructions stored in OCR routines 256; therefore, only differences between the functionality resulting from the execution of OCR module 318 and OCR routines 256 will be further described.

In another aspect, CPU 306 may execute instructions stored in OCR module 318 to perform any suitable number N of OCR routines 320.1-320.N on one or more odometer images received via a mobile computing device. As previously discussed with reference to mobile computing device 200, as shown in FIG. 2, OCR routines 320.1-320.N may correspond to any suitable number and/or type of OCR processes. In one embodiment, at least two different types of OCR processes may be performed on the same odometer image.

If the odometer mileages match, then odometer verification application 313 may generate a successful OCR validation indicator, which may be stored in any suitable portion of memory 312 and/or in one or more insurance infrastructure devices. Upon generation of a successful OCR validation indicator, one or more actions may be may be triggered.

Again, in some aspects, an odometer mileage may be verified with or without the utilization of one or more OCR processes. In accordance with aspects that utilize manual review and do not utilize OCR processes, a user may verify the odometer mileage via any suitable interaction with external computing device 300, which may be detected via odometer verification application 313. A manual odometer validation indicator may be generated upon receipt of such an input in this case. The manual odometer validation indicator may also be generated upon receipt of an input indicating the resolution of a manual review when a failed OCR validation is generated, which is further discussed below. Upon generation of the manual odometer validation indicator, one or more actions may also be triggered.

For example, the generation of a successful OCR validation indicator and/or a manual odometer validation indicator may trigger communication unit 308 to store the calculated odometer mileage to update the insurer's profile via execution of data read/write module 316 by CPU 306. To provide another example, the generation of a successful OCR validation indicator and/or a manual odometer validation indicator may trigger odometer verification application 313 to compare the verified odometer mileage to an expected or anticipated vehicle mileage, a previous vehicle mileage (e.g., one from the history of odometer mileages in the insurer's profile), and/or a mileage limit associated with the insurance policy. Odometer verification application 313 may determine whether the verified odometer mileage has resulted in a loss of one or more discounts, recalculate a user's premium based upon the verified odometer mileage and/or loss of one or more discounts, and/or apply one or more new discounts as part of the updated premium calculation, which is further discussed below with reference to the execution of instructions stored in mileage forecasting module 326.

To provide another example, the generation of generation of a successful OCR validation indicator and/or a manual odometer validation indicator may trigger communication unit 308 to send a notification to the mobile computing device indicating the odometer mileage has been verified and/or updated via execution of notification generator module 315 by CPU 306. The notification may additionally or alternatively include, for example, an indication that the insured has exceeded a mileage limit (or likely will), whether the insured has lost his qualification for one or more existing discounts, new discounts for which the insured may qualify, a new premium rate, etc.

If the odometer mileages do not match, then odometer verification application 313 may generate a failed OCR validation indicator, which may be stored in any suitable portion of memory 312 and/or in one or more insurance infrastructure devices. Generation of the failed OCR validation indicator may trigger one or more acts. For example, the generation of the failed OCR validation indicator may trigger communication unit 308 to store a manual review flag as part of the insurer's updated profile data via execution of data read/write module 316 by CPU 306.

To provide another example, the generation of the failed OCR validation indicator may trigger communication unit 308 to send a notification to one or more insurance employees indicating the odometer image requires manual review via execution of notification generator module 315 by CPU 306. To provide yet another example, the generation of the failed OCR validation indicator may trigger communication unit 308 to send a notification to the mobile computing device indicating the manual review status and/or an indication that the odometer mileage has not been successfully updated via execution of notification generator module 315 by CPU 306.

CPU 306 may execute instructions stored in image validation module 324 to perform acts substantially similar to those performed by MP 206 when executing instructions stored in image validation routine 258; therefore, only differences between the functionality resulting from the execution of image validation module 324 and image validation routine 258 will be further described.

In one aspect, CPU 306 may execute instructions stored in image validation module 324 to identify a potentially fraudulent odometer image. As previously discussed with respect to mobile computing device 200, as shown in FIG. 2, image validation module 324 may include instructions that, when executed by CPU 306, cause CPU 306 to analyze status data and/or metadata received from the mobile computing device. CPU 306 may additionally or alternatively analyze policy profile data retrieved via the insurance infrastructure and compare this data to the status data and/or metadata.

For example, CPU 306 may execute instructions stored in image validation module 324 to determine whether a mobile computing device 200 was located in proximity to a vehicle when the odometer image was captured based upon status data included in the odometer image and/or received separately from the odometer image. To provide another example, CPU 306 may execute instructions stored in image validation module 324 to determine whether geographic location data included as metadata in the odometer image matches a geofence associated with an insurer's address stored as part of a policy profile. To provide another example, CPU 306 may execute instructions stored in image validation module 324 to determine whether the odometer image has been graphically manipulated.

If the odometer image is not validated and may be potentially fraudulent, then odometer verification application 313 may generate a failed odometer image validation indicator. Generation of the failed odometer image validation indicators may trigger one or more acts.

For example, a failed odometer image validation indicator may trigger communication unit 308 to store a manual review flag (which may be the same data as the failed odometer image validation indicator) as part of the insurer's updated profile data via execution of data read/write module 316 by CPU 306. To provide another example, the generation of the failed odometer image validation indicator may trigger communication unit 308 to send a notification to one or more insurance employees indicating the odometer image requires manual review via execution of notification generator module 315 by CPU 306. To provide yet another example, generation of the failed odometer image validation indicator may trigger communication unit 308 to send a notification to the mobile computing device indicating the manual review status and/or an indication that the odometer mileage has not been successfully updated via execution of notification generator module 315 by CPU 306.

CPU 306 may execute instructions stored in mileage forecasting module 326 to determine an estimated future mileage for any suitable period of time from two or more previously calculated mileages. Upon executing instructions stored in in mileage forecasting module 326, CPU 306 may predict, extrapolate, anticipate, and/or forecast a future mileage using any suitable techniques from any suitable number of previous mileages as data points, such as curve fitting, linear extrapolation, polynomial extrapolation, etc. In an embodiment, this period of time and estimated future mileage may correspond to those used to calculate an insurance premium, such as an annual mileage, for example.

To provide an illustrative example, an insured may provide an initial annual mileage estimate regarding the miles he expects to drive over the next year, upon which an insurance premium is based for a 6-month coverage period. The insurance premium may take into consideration various discounts, specials, promotions, etc., if the annual mileage is below some threshold value set by the insurer. The initial calculated premium is then maintained throughout the 6-month coverage period. Upon renewal of the policy at the end of the 6-month coverage period, if the forecasted annual mileage, which has been calculated from two or more odometer reporting within the 6-month coverage period, is greater than the initial annual mileage estimate, the insured may lose this discount and/or the new calculated insurance premium for the next 6 months of coverage may increase accordingly. In various aspects, the calculation of a new premium for the next coverage period may increase (e.g., discounts lost) when the forecasted mileage is greater than the annual mileage by some threshold amount (e.g., 10% or more) and otherwise the premium may remain the same.

Again, the future mileage may be forecasted using any suitable number or previous mileages as data points. To provide an illustrative example of a forecasting technique, a user may report a first odometer mileage as N1 miles on a first date, and a second odometer mileage as N2 on a second date that is a month after the first date. The difference N2−N1 represents the user's monthly mileage, which may be multiplied by 12 to forecast the annual mileage. Because a one-month sample may not accurately depict a user's average driving habits, this extrapolation may similarly be applied to more than two odometer reporting to better forecast the annual mileage.

In various aspects, the forecasted annual mileage may be sent in one or more notifications to one or more policy holders via execution of instructions stored in notification generator module 315. For example, the forecasted annual mileage may be sent with the verification that the odometer mileage has been successfully updated, as part of the history of odometer mileages that are viewed on a mobile computing device, as part of a renewal notice that includes a new (or the same) insurance premium calculation, etc.

Exemplary Screenshots

FIG. 4A illustrates an exemplary screenshot 400 that may be displayed on a mobile computing device upon starting a mobile computing device application. In various aspects, screen 400 may be displayed on a mobile computing device, such as mobile computing device 106 or mobile computing device 200, for example, as shown in FIGS. 1 and 2, respectively. In accordance with such aspects, screen 400 may be displayed as part of a device display, such as display 216, for example, as shown in FIG. 2.

In some aspects, screen 400 may be displayed upon a user launching, executing, and/or initiating a respective application that has been installed on the mobile computing device, which may correspond to odometer mileage updating application 246, for example, as shown in FIG. 2. The screen 400 may be displayed upon a user selecting a suitable icon from an interactive screen implemented by a mobile computing device, resulting in the application being launched.

But in other aspects, screen 400 may be displayed in response to a user acknowledging a reminder notification to update the odometer mileage associated with one or more vehicles, as previously discussed. For example, a user may select (via an appropriate interactive gesture) a push notification displayed on the screen of the mobile device, resulting in the application being launched. A reminder notification is not shown in FIG. 4A for purposes of brevity.

Upon the application being launched, a user may be presented with a splash screen and/or a login screen in which to provide logon credentials to access his policy profile information. Upon providing the proper logon credentials, such as a username and password, for example, the mobile computing device may communicate with one or more external computing devices (e.g., external computing device 114.1 and/or external computing device 114.2) to access policy data corresponding to the identified username.

Upon the one or more external computing devices accessing the user's policy data (e.g., via infrastructure 116), the mobile computing device may determine one or more vehicles associated with mileage-based discounts. Screen 400 includes a list 402 of the vehicles from which a user may select in accordance with such aspects.

FIG. 4B illustrates an exemplary screenshot 440 that may be displayed on a mobile computing device upon a user selecting a vehicle from the list displayed in FIG. 4A. As shown in FIG. 4B, screen 440 includes a portion 442 and a portion 446.

Portion 442, when selected by the user, initiates the mobile computing device camera (e.g., image capture device 226), thereby allowing a user to capture an image of the odometer corresponding to the vehicle selected from list 402. Again, in various aspects, once the odometer image is captured, the odometer mileage may be calculated locally at the mobile computing device, or the odometer image may be sent to one or more external computing devices that perform this mileage calculation and verification.

Portion 446, when selected by a user, displays an odometer history from the user's policy data that is associated with the selected vehicle from list 402. In this way, the application allows a user to conveniently view the odometer mileage history while she is currently updating the odometer mileage for the vehicle selected from list 402.

FIG. 4C illustrates an exemplary screenshot 480 that may be displayed on a mobile computing device upon a user selecting the option to review odometer history from the list of options shown in FIG. 4B. The odometer mileage history 482 may be displayed upon one or more external computing devices accessing the user's policy data via the user's login credentials. As shown in FIG. 4C, odometer mileage history 482 includes a time, date, and odometer mileage for various dates and times throughout the policy term. Although not shown in FIG. 4C for purposes of brevity, odometer mileage history 482 may display additional data such as whether each odometer mileage reporting was confirmed from previously submitted odometer images, whether one or more odometer mileage reportings were flagged for manual review and/or as being potentially fraudulent, whether the discount mileage threshold has been exceeded for the current policy term, etc.

Exemplary Methods & Technical Advantages

Figure 5:
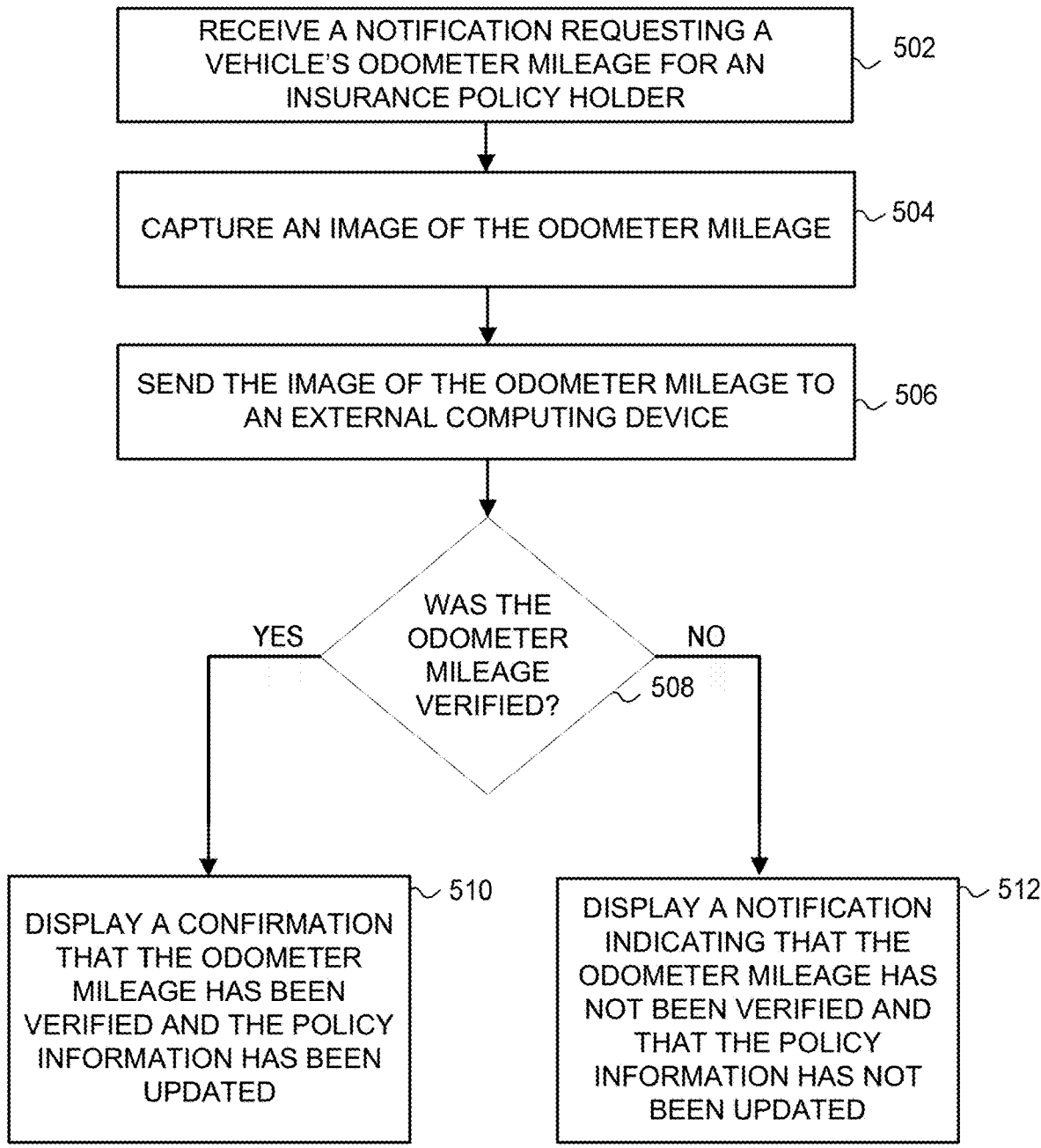
FIG. 5 illustrates an example method 500 in accordance with an exemplary aspect of the present disclosure.

FIG. 5 illustrates an example method 500 in accordance with an exemplary aspect of the present disclosure. In the present aspect, method 500 may be implemented by any suitable computing device (e.g., mobile computing device 106 or external computing device 114.1 and/or external computing device 114.2, as shown in FIG. 1). In one aspect, method 500 may be performed by one or more processors, applications, and/or routines, such as any suitable portion of controller 240, software applications 244, and/or software routines 252, for example, as shown in FIG. 2.

Method 500 may start when one or more processors receive a notification requesting a vehicle's odometer mileage for an insurance policy holder (block 502). This may include, for example, a notification that is generated by one or more external computing devices configured to access a user's policy data, which may generate the notification in response to the passage of a threshold date prior to expiration of an insurance policy associated with the vehicle (block 502).

Method 500 may include one or more processors capturing an image of the odometer mileage (block 504). This may include, for example, a user capturing the odometer image with a camera that is integrated as part of a mobile computing device receiving the notification (block 504).

Method 500 may include one or more processors sending the odometer image to an external computing device (block 506). The external computing device may receive the odometer image and perform a first and a second OCR process on the odometer image, which is then used by the external computing device to calculate a first and a second odometer mileage, respectively. Further in accordance with such an aspect, the external computing device may determine whether the first and the second odometer mileage match to verify the odometer mileage.

Method 500 may include one or more processors determining whether the odometer mileage was verified (block 508). This may include, for example, the external computing device determining whether the mileage calculations from the first and second OCR processes match one another (block 508). This may also include, for example, the external computing device determining that, if the mileage calculations from the first and second OCR processes match one another, that the odometer image is not potentially fraudulent (or has not been flagged as such by the mobile computing device) (block 508). To provide another example, this may include the result of the manual review of an odometer image that has been flagged for review upon different OCR processes not matching one another or different manual reviews not matching one another (block 508). To provide a further example, this may include two manual review processes of the odometer images matching one another. Once verified, method 500 may continue to display a confirmation that the odometer mileage has been verified (block 510). Otherwise, method 500 may continue to display a notification that the odometer mileage has not been verified (block 512).

Method 500 may include one or more processors displaying a confirmation that the odometer mileage has been verified and that the policy information associated with the vehicle has been updated (block 510). This may include, for example, the mobile computing device receiving a notification from the external computing device that the odometer mileage has been verified (block 508) and the user's policy information successfully update, and the mobile computing device in turn displaying this information to the user via the mobile computing device display (block 510).

Method 500 may include one or more processors displaying a confirmation that the odometer mileage has not been verified and that the policy information associated with the vehicle has not been updated (block 512). This may include, for example, the mobile computing device receiving a notification from the external computing device that the odometer mileage has not been verified (block 508), the mobile computing device in turn displaying this information to the user via the mobile computing device display (block 512). Method 500 may include additional, less, or alternate actions, including those discussed elsewhere herein.

Figure 6:
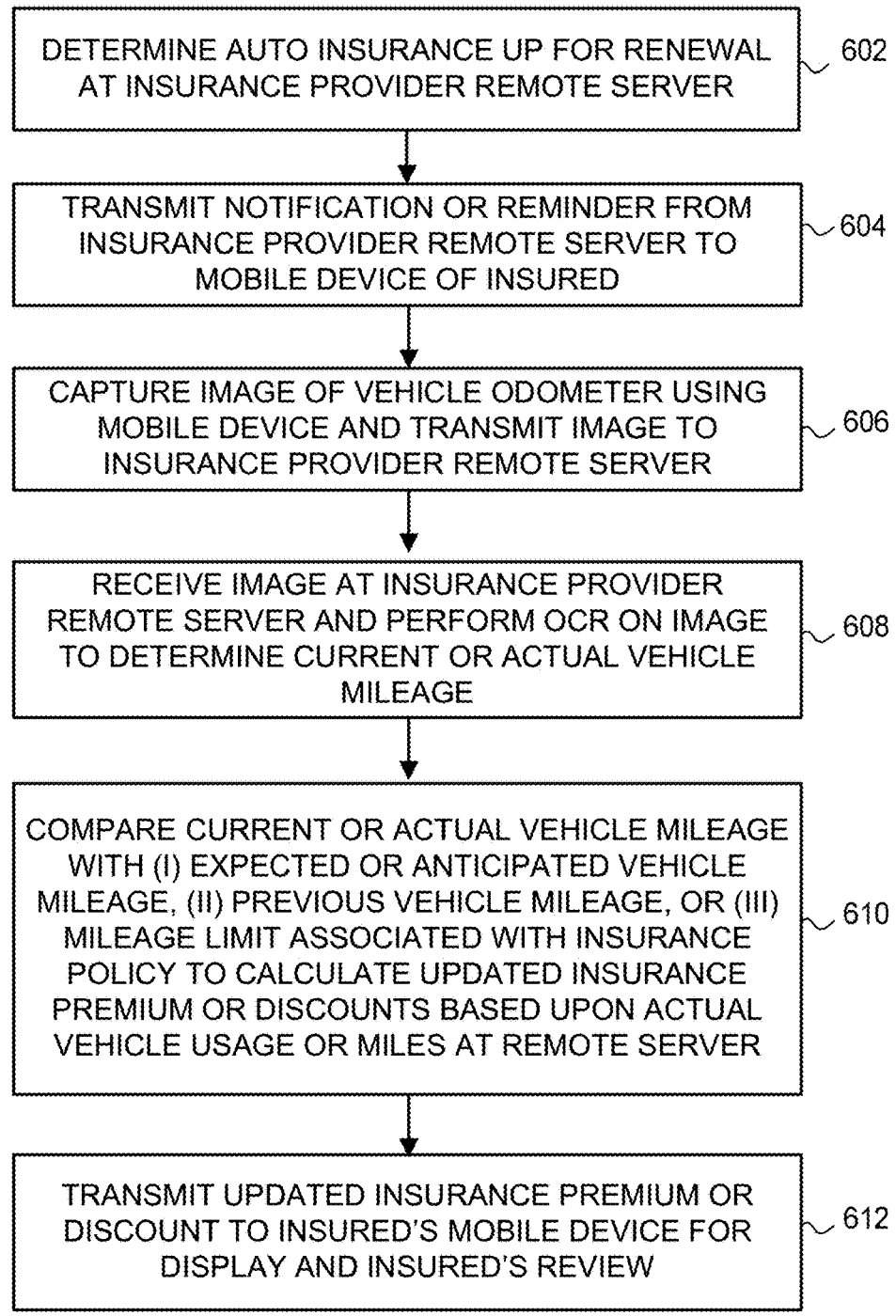
FIG. 6 illustrates an example method 600 in accordance with an exemplary aspect of the present disclosure.

FIG. 6 illustrates an example method 600 in accordance with an exemplary aspect of the present disclosure. In the present aspect, method 600 may be implemented by any suitable computing device (e.g., mobile computing device 106 or external computing device 114.1 and/or external computing device 114.2, as shown in FIG. 1). In one aspect, method 600 may be performed by one or more processors, applications, and/or routines, such as any suitable portion of controller 240, software applications 244, and/or software routines 252, for example, as shown in FIG. 2. In another aspect, method 600 may be performed by one or more processors, applications, and/or routines, such as any suitable portion of CPU 306, communication unit 308, odometer verification application 313, and/or the one or more of notification generator module 315, data read/write module 316, OCR recognition module 318, and/or image validation module 324, for example, as shown in FIG. 3.

Method 600 may start when one or more processors determine that a user's auto insurance is up for renewal via an insurance provider remote server (block 602). This may include, for example, a notification that is generated by one or more external computing devices (e.g., external computing device 114.1 and/or external computing device 114.2) that are configured to access a user's policy data, and which may generate the notification in response to the passage of a threshold date prior to expiration of an insurance policy (block 602).

Method 600 may include one or more processors transmitting a notification or reminder from the insurance provided remote server to the mobile device of the insured (block 604). This may include, for example communication unit 308 transmitting any suitable type of reminder and/or notification to a mobile device (e.g., mobile computing device 106) (block 604). In various aspects, the notification and/or reminder may be transmitted such that it is received via the mobile device and displayed in any suitable format, such as an email, a text message, a push notification, etc. (block 604).

Method 600 may include one or more processors capturing an image of a vehicle odometer using the mobile device and transmitting the image to the insurance provider remote server from the mobile device (block 606). Again, the mobile device (e.g., mobile computing device 106) may display a prompt requesting the odometer reporting is due and informing the user that an image may be captured of the odometer. In response to this notification, the user may capture the odometer image and use the mobile device to transmit this image to the insurance provider remote server (e.g., external computing device 114.1 and/or external computing device 114.2) (block 606).

Method 600 may include one or more processors at the insurance provider remote server receiving the image of the odometer and performing OCR on the image to determine the current or actual vehicle mileage (block 608). This may include, for example, CPU 306 performing one or more OCR processes on the odometer image to calculate the vehicle mileage (block 608). The one or more OCR processes may be of any suitable type, such as a matrix matching OCR process, a feature extraction OCR process, an adaptive recognition OCR process, etc. (block 608).

Method 600 may include one or more processors comparing the current or actual vehicle mileage with (1) expected or anticipated vehicle mileage, (2) previous vehicle mileage, and/or (3) a mileage limit associated with an insurance policy to calculate an updated insurance premium and/or discounts based upon actual vehicle usage or mileage (block 610). This may include, for example, a comparison to an annual or semi-annual mileage estimate provided by the policy holder. To provide another example, the current mileage calculation may be compared to a vehicle mileage limit that would disqualify the policy holder from continuing to receive the discount (block 610).

Method 600 may include one or more processors transmitting an updated insurance premium and/or discount to the insured's mobile device for display and review by the insured (block 612). Again, the updated insurance premium and/or discount may be transmitted to cause any suitable type of notification to be displayed at the mobile device (block 612). In one aspect, the updated insurance premium and/or discount may be based upon the comparison of the current mileage to one or more other mileages (block 610). Method 600 may include additional, less, or alternate actions, including those discussed elsewhere herein.

Additional Technical Advantages

In the various aspects described herein, mobile computing device 200 and/or external computing device 300 may facilitate the updating of odometer mileage associate with an insured vehicle utilizing an odometer image. Additionally or alternatively, these aspects may provide other benefits relating to the technical operation of mobile computing device 200, external computing device 300, and/or the one or more infrastructure devices.

In various aspects, mobile computing device 200 and/or external computing device 300 may advantageously utilize two or more OCR processes to verify a calculated mileage. Thus, in accordance with such aspects, mobile computing device 200 and/or external computing device 300 may perform more efficiently by avoiding the execution of several single OCR processes, which are more likely to be erroneous and require subsequent correction.

Furthermore, mobile computing device 200 and/or external computing device 300 may also provide benefits such as decreased network bandwidth, as less communication is required between the insurers and policy holders due to the increased chance of the submitted odometer images providing the correct odometer mileage. And due to the increased efficiency, mobile computing device 200 and/or external computing device 300 may also save power that would otherwise be utilized for the transmission and/or reception of additional mileage updating reminders and/or notifications.

Exemplary Method of Verifying a Vehicle Odometer Mileage

In one aspect, a computer-implemented method for verifying an odometer mileage corresponding to a vehicle may be provided. A method may include (1) receiving a notification requesting the odometer mileage when the notification is being generated in response to passage of a threshold date prior to expiration of an insurance policy associated with the vehicle; (2) capturing an image of an odometer corresponding to the vehicle in response to the notification; (3) sending the image of the odometer to an external computing device, whereupon the external computing device (i) performs a first and a second optical character recognition (OCR) process on the image of the odometer to calculate a first and a second odometer mileage, respectively, (ii) determines whether the first and the second odometer mileage match to verify the odometer mileage, and (iii) updates a user profile associated with the insurance policy to indicate the odometer mileage; and/or (4) displaying a confirmation that the odometer mileage has been verified when the first and the second odometer mileage match. The method may include additional, less, or alternate actions, including those discussed elsewhere herein.

For instance, in various aspects, the first OCR process may include a matrix matching process, while the second OCR process may include a feature extraction or an adaptive recognition process.

The method may also include generating a failed OCR validation indicator when the first and the second odometer mileage determined via the first and second OCR processes, respectively, do not match one another.

Additionally or alternatively, the image of the odometer may be captured via a mobile computing device. In such a case, aspects described may also include adding metadata to the image of the odometer prior to sending the image of the odometer to the external computing device. The metadata may be indicative of a communication status of the mobile computing device when the image of the odometer was captured.

Additionally or alternatively, aspects may include utilizing the metadata to determine whether the mobile computing device was located in communication with the vehicle when the image was captured, and to generate a manual review flag when the metadata indicates that the mobile computing device was not located inside of the vehicle when the image was captured.

Additionally or alternatively, aspects include a user's insurance policy being associated with a user profile, which may include a history of odometer mileages calculated. The history of odometer mileages may be calculated from a plurality of odometer images that were sent to an external computing device or otherwise calculated over a period of time. The user profile data may be displayed on the mobile computing device and may include the history of odometer mileages.

Exemplary Non-Transitory Medium

In another aspect, a non-transitory, tangible computer-readable medium storing machine readable instructions in a mobile computing device is described that, when executed by a processor, cause the processor to: (1) receive a notification requesting the odometer mileage when the notification is being generated in response to passage of a threshold date prior to expiration of an insurance policy associated with the vehicle; (2) capture an image of an odometer corresponding to the vehicle in response to the notification; (3) send the image of the odometer to an external computing device, whereupon the external computing device (i) performs a first and a second optical character recognition (OCR) process on the image of the odometer to calculate a first and a second odometer mileage, respectively, (ii) determines whether the first and the second odometer mileage match to verify the odometer mileage, and (iii) updates a user profile associated with the insurance policy to indicate the odometer mileage; and/or (4) display a confirmation that the odometer mileage has been verified when the first and the second odometer mileage match. The non-transitory, tangible computer-readable medium may include additional, fewer, or alternate instructions, including those discussed elsewhere herein.

In various aspects, the first OCR process may include a matrix matching process, while the second OCR process may include a feature extraction or an adaptive recognition process.

Aspects may include the external computing device, upon determining that the first and the second odometer mileage do not match, generating a failed OCR validation indicator.

Additionally or alternatively, the non-transitory, tangible computer-readable medium may include instructions to facilitate the image of the odometer being captured via a mobile computing device. In such a case, the non-transitory, tangible computer-readable medium may include instructions to add metadata to the image of the odometer prior to sending the image of the odometer to the external computing device. The metadata may be indicative of a communication status of the mobile computing device when the image of the odometer was captured.

Additionally or alternatively, aspects may include the non-transitory, tangible computer-readable medium having instructions to utilize the metadata to determine whether the mobile computing device was located inside of the vehicle when the image was captured based upon the metadata, and to generate a manual review flag when the metadata indicates that the mobile computing device was not located inside of the vehicle when the image was captured.

Additionally or alternatively, aspects include a user's insurance policy being associated with a user profile, which may include a history of odometer mileages calculated. Aspects may include the non-transitory, tangible computer-readable medium having instructions to display a history of calculated odometer mileages. The history of odometer mileages may be calculated from a plurality of odometer images that were sent to an external computing device or otherwise calculated over a period of time. The user profile data may be displayed on the mobile computing device and may include the history of odometer mileages.

Exemplary Mobile Computing Device

In yet another aspect, a mobile computing device is described that includes a communication unit configured to receive a notification requesting a vehicle odometer mileage, the notification being generated in response to passage of a threshold date prior to expiration of an insurance policy associated with a user account profile corresponding to the vehicle. The mobile computing device may also include an image capture unit configured to capture an image of the vehicle odometer in response to the notification. The communication unit may be further configured to send the image of the odometer to an external computing device, whereupon the external computing device (i) performs a first and a second optical character recognition (OCR) process on the image to calculate a first and a second odometer mileage, respectively, (ii) determines whether the first and the second odometer mileage match to verify the vehicle odometer mileage, and/or (iii) updates the user profile associated with the insurance policy associated with the vehicle to indicate the vehicle odometer mileage. Furthermore, the mobile computing device may also include a graphical processing unit (GPU) configured to display a confirmation that the odometer mileage for the corresponding vehicle has been verified when the first and the second odometer mileage match. The mobile computing device may include additional, fewer, or alternate components and/or functionality, including those discussed elsewhere herein.

In various aspects, the first OCR process may include a matrix matching process, while the second OCR process may include a feature extraction or an adaptive recognition process.

The processor may be further configured to generate a failed OCR validation indicator when the first and the second odometer mileage determined via the first and second OCR processes, respectively, do not match one another Additionally or alternatively, the mobile computing device may include an image capture unit configured to capture the image of the odometer. In such a case, the processor may be further configured to add metadata to the image of the odometer prior to sending the image of the odometer to the external computing device. The metadata may be indicative of a communication status of the mobile computing device when the image of the odometer was captured.

Additionally or alternatively, aspects may include the external computing device utilizing the metadata to determine whether the mobile computing device was communicating with the vehicle when the image was captured based upon the metadata, and to generate a manual review flag when the metadata indicates that the mobile computing device was not communicating with the vehicle when the image was captured.

Additionally or alternatively, aspects include a user's insurance policy being associated with a user profile, which may include a history of odometer mileages calculated. The history of odometer mileages may be calculated from a plurality of odometer images that were sent to the external server over time. The user profile data may be displayed on the mobile computing device and may include the history of odometer mileages.

Additionally or alternatively, aspects include a user's insurance policy being associated with a user profile, which may include a history of odometer mileages calculated. The history of odometer mileages may be calculated from a plurality of odometer images that were sent to an external computing device or otherwise calculated over a period of time. The GPU may be configured to display on the mobile computing device the history of odometer mileages.

Exemplary Method

In one aspect, a computer-implemented method of providing usage-based auto insurance discounts may be provided. The method may include (1) determining, via one or more processors (such as insurance provider remote server), that an auto insurance policy is up for renewal; (2) transmitting, via the one or more processors (and wireless communication and data transmission), a notification or reminder to a mobile device associated with an insured requesting that the insured capture a digital image of an odometer of an insured vehicle using their mobile device; (3) receiving, via the one or more processors (and wireless communication and data transmission), the digital image of the odometer of the insured vehicle from the mobile device of the insured; (4) performing, via the one or more processors, an OCR (optical character recognition) technique on, or other computer analysis of, the digital image to determine a current and actual vehicle mileage for the insured vehicle; (5) comparing, via the one or more processors, the current and actual vehicle mileage with (i) an expected or anticipated vehicle mileage (based upon customer and vehicle information associated with an existing auto insurance policy or otherwise stored in a customer database), (ii) a previous vehicle mileage, and/or (iii) an insurance policy mileage limit or coverage to determine an auto insurance policy premium or discount based upon the differences between the current and actual vehicle mileage and the (i) expected or anticipated vehicle mileage, (ii) previous vehicle mileage, and/or (iii) insurance policy mileage limit; and/or (6) transmitting, via the one or more processors (and wireless communication and data transmission), the auto insurance policy premium or discount to the insured's mobile device for their review, modification, and/or approval to facilitate providing vehicle usage-based auto insurance. The method may include additional, less, or alternate actions, including those discussed elsewhere herein.

For instance, the method may include calculating, via the one or more processors, a difference between (a) the previous image or mileage determined from OCR of a previous image of the odometer, and (b) the current mileage determined from a current digital image of the odometer, the difference being representative of actual vehicle miles or usage since the last mileage update; dividing, via the one or more processors, the actual vehicle miles or usage by a number of days in between images (as determined from OCR or date time stamp of the digital images) to estimate annual mileage usage; and/or based upon the estimated annual mileage usage, determining, via the one or more processors, a discount on auto insurance for the insured.

The method may include determining, via the one or more processors, that the image of the odometer is of a correct make and model, i.e., of a same make and model of the insured vehicle. The method may include determining, via the one or more processors, that the image of the odometer is not photoshopped, digitally edited, or otherwise a fake.

Additional Considerations

The following aspects have been described in the context of one or more insured persons reporting odometer mileages for one or more auto insurance policies. However, these aspects may also include any suitable type of policy for which odometer mileage may be utilized for the calculation of insurance premiums. For example, the aspects as described herein may apply to fleets of automobiles, agency car pools, etc. The data sent via a mobile computing device in accordance with these aspects may include any suitable type of information to facilitate the calculation of a relevant insurance policy, such as a user identifier, an employee number, a car identifier and/or number, etc.

Furthermore, although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed:

1. A computer-implemented method for verifying an odometer mileage corresponding to a vehicle, the method comprising:
   receiving, by one or more processors, a notification requesting the odometer mileage, the notification being generated in response to passage of a threshold date prior to expiration of an insurance policy associated with the vehicle;
   capturing, by one or more processors, an image of an odometer corresponding to the vehicle in response to the notification;
   sending, by one or more processors, the image of the odometer to an external computing device, whereupon the external computing device (i) performs a first and a second optical character recognition (OCR) process on the image of the odometer to calculate a first and a second odometer mileage, respectively, (ii) determines whether the first and the second odometer mileage match to verify the odometer mileage, and (iii) updates a user profile associated with the insurance policy to indicate the odometer mileage; and
   displaying, by one or more processors, a confirmation that the odometer mileage has been verified when the first and the second odometer mileage match.

2. The method of claim 1, wherein the act of performing the first OCR process comprises:
   performing a matrix matching OCR process.

3. The method of claim 1, wherein the act of performing the second OCR process further comprises:
   performing a feature extraction or an adaptive recognition OCR process.

4. The method of claim 1, further comprising:
   generating, by one or more processors, a failed OCR validation indicator when the first and the second odometer mileage do not match.

5. The method of claim 1, wherein the image of the odometer is captured by the mobile computing device, and further comprising:
   adding, by one or more processors, metadata to the image of the odometer prior to sending the image of the odometer to the external computing device, and wherein the metadata is indicative of a communication status of the mobile computing device when the image of the odometer was captured.

6. The method of claim 5, further comprising:
generating, by one or more processors, a manual review flag when the metadata indicates that the mobile computing device was not in communication with the vehicle when the image was captured.

7. The method of claim 1, further comprising:
displaying, by one or more processors, a history of odometer mileages calculated from a plurality of images of the odometer over a period of time.

8. A non-transitory, tangible computer-readable medium storing machine readable instructions in a mobile computing device, that when executed by a processor, cause the processor to:
receive a notification requesting a vehicle odometer mileage, the notification being generated in response to passage of a threshold date prior to expiration of an insurance policy associated with a user account profile corresponding to the vehicle;
capture an image of the vehicle odometer in response to the notification;
send the image of the odometer to an external computing device, whereupon the external computing device (i) performs a first and a second optical character recognition (OCR) process on the image to calculate a first and a second odometer mileage, respectively, (ii) determines whether the first and the second odometer mileage match to verify the vehicle odometer mileage, and (iii) updates the user profile associated with the insurance policy associated with the vehicle to indicate the vehicle odometer mileage; and
display a confirmation that the odometer mileage for the corresponding vehicle has been verified when the first and the second odometer mileage match.

9. The non-transitory, tangible computer-readable medium of claim 8, wherein the first OCR process includes a matrix matching OCR process.

10. The non-transitory, tangible computer-readable medium of claim 8, wherein the second OCR process includes a feature extraction or an adaptive recognition OCR process.

11. The non-transitory, tangible computer-readable medium of claim 8, wherein the external computing device, upon determining that the first and the second odometer mileage do not match, generates a failed OCR validation indicator.

12. The non-transitory, tangible computer-readable medium of claim 8, wherein the instructions to send the image of the odometer to the external computing device further include instructions, that when executed by the processor, cause the processor to:
add metadata to the image of the odometer prior to sending the image of the odometer to the external computing device, and
wherein the metadata is indicative of a communication status of the mobile computing device when the image of the odometer was captured.

13. The non-transitory, tangible computer-readable medium of claim 12, wherein the external computing device, upon determining that the mobile computing device was not communicating with the vehicle when the image was captured based upon the metadata, generates a manual review flag.

14. The non-transitory, tangible computer-readable medium of claim 8, further including instructions, that when executed by the processor, cause the processor to:
display a history of odometer mileages calculated from a plurality of images of the odometer over a period of time.

15. A mobile computing device, comprising:
a communication unit configured to receive a notification requesting a vehicle odometer mileage, the notification being generated in response to passage of a threshold date prior to expiration of an insurance policy associated with a user account profile corresponding to the vehicle;
an image capture unit configured to capture an image of the vehicle odometer in response to the notification,
wherein the communication unit is further configured to send the image of the odometer to an external computing device, whereupon the external computing device (i) performs a first and a second optical character recognition (OCR) process on the image to calculate a first and a second odometer mileage, respectively, (ii) determines whether the first and the second odometer mileage match to verify the vehicle odometer mileage, and (iii) updates the user profile associated with the insurance policy associated with the vehicle to indicate the vehicle odometer mileage; and
a graphical processing unit (GPU) configured to display a confirmation that the odometer mileage for the corresponding vehicle has been verified when the first and the second odometer mileage match.

16. The mobile computing device of claim 15, wherein the external computing device is further configured to perform a matrix matching OCR process as the first OCR process.

17. The mobile computing device of claim 15, wherein the external computing device is further configured to perform a feature extraction or an adaptive recognition OCR process as the second OCR process.

18. The mobile computing device of claim 15, wherein the external computing device is further configured to generate a failed OCR validation indicator when the first and the second odometer mileage do not match.

19. The mobile computing device of claim 15, further comprising:
a processor configured to add metadata to the image of the odometer prior to sending the image of the odometer to the external computing device, and
wherein the metadata is indicative of a communication status of the mobile computing device when the image of the odometer was captured.

20. The mobile computing device of claim 19, wherein the external computing device is further configured to generate a manual review flag when the metadata indicates that the mobile computing device was not communicating with the vehicle when the image was captured.

* * * * *